United States Patent
Doan et al.

(10) Patent No.: US 7,483,198 B2
(45) Date of Patent: Jan. 27, 2009

(54) MICROMIRROR DEVICE AND METHOD FOR MAKING THE SAME

(75) Inventors: Jonathan Doan, Mountain View, CA (US); Andrew Huibers, Palo Alto, CA (US); Satyadev Patel, Sunnyvale, CA (US); James Dunphy, San Jose, CA (US); Dmitri Simonian, Sunnyvale, CA (US); Hongqin Shi, San Jose, CA (US); Jianglong Zhang, Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 348 days.

(21) Appl. No.: 11/056,752

(22) Filed: Feb. 11, 2005

(65) Prior Publication Data

US 2005/0157375 A1 Jul. 21, 2005

Related U.S. Application Data

(63) Continuation-in-part of application No. 10/613,379, filed on Jul. 3, 2003, now Pat. No. 6,873,450, and a continuation-in-part of application No. 10/437,776, filed on May 13, 2003, now Pat. No. 7,099,065, and a continuation-in-part of application No. 10/698,563, filed on Oct. 30, 2003, now Pat. No. 7,042,622, and a continuation-in-part of application No. 10/366,297, filed on Feb. 12, 2003, now Pat. No. 6,867,897.

(51) Int. Cl.
  *G02B 26/00* (2006.01)
(52) U.S. Cl. ...................................... 359/291
(58) Field of Classification Search ............ 359/291, 359/292, 293, 295, 298, 214, 220, 222, 223, 359/224, 230, 320, 322
  See application file for complete search history.

(56) References Cited

U.S. PATENT DOCUMENTS

| | | | |
|---|---|---|---|
| 5,999,306 A | 12/1999 | Atobe | |
| 6,028,690 A | 2/2000 | Carter et al. | |
| 6,522,454 B2 | 2/2003 | Meier et al. | |
| 6,523,961 B2 | 2/2003 | Ilkov et al. | |
| 6,529,310 B1 * | 3/2003 | Huibers et al. | 359/291 |
| 6,820,988 B2 * | 11/2004 | van Drieenhuizen et al. | 359/872 |
| 6,992,810 B2 | 1/2006 | Pan et al. | |
| 7,022,245 B2 | 4/2006 | Pan et al. | |
| 7,026,695 B2 | 4/2006 | Yang et al. | |
| 7,034,984 B2 | 4/2006 | Pan et al. | |
| 7,075,701 B2 * | 7/2006 | Novotny et al. | 359/291 |
| 7,092,143 B2 * | 8/2006 | Heureux | 359/291 |

(Continued)

FOREIGN PATENT DOCUMENTS

WO  WO 2004/000720  12/2003

(Continued)

*Primary Examiner*—Hung X Dang
*Assistant Examiner*—Tuyen Q Tra
(74) *Attorney, Agent, or Firm*—Wade James Brady, III; Frederick J. Telecky, Jr.

(57) ABSTRACT

Disclosed herein is a micromirror device having in-plane deformable hinge to which a deflectable and reflective mirror plate is attached. The mirror plate rotates to different angles in response to an electrostatic field established between the mirror plate and an addressing electrode associated with the mirror plate.

29 Claims, 15 Drawing Sheets

U.S. PATENT DOCUMENTS

| | | | |
|---|---|---|---|
| 7,209,274 B2 * | 4/2007 | Van Drieenhuizen et al. | 359/224 |
| 2002/0024641 A1 | 2/2002 | Ilkov et al. | |
| 2004/0004753 A1 | 1/2004 | Pan | |
| 2004/0207924 A1 | 10/2004 | Chen | |
| 2004/0214350 A1 | 10/2004 | Pan et al. | |
| 2004/0240033 A1 | 12/2004 | Pan et al. | |
| 2005/0101059 A1 | 5/2005 | Yang | |
| 2005/0104144 A1 | 5/2005 | Yang et al. | |
| 2005/0174628 A1 | 8/2005 | Kelly et al. | |
| 2005/0255412 A1 | 11/2005 | Yang | |
| 2005/0255666 A1 | 11/2005 | Yang | |
| 2006/0023286 A1 | 2/2006 | Yang | |
| 2006/0024919 A1 | 2/2006 | Yang | |
| 2006/0046429 A1 | 3/2006 | Yang | |
| 2006/0046430 A1 | 3/2006 | Yang | |
| 2006/0063355 A1 | 3/2006 | Yang | |

FOREIGN PATENT DOCUMENTS

| | | |
|---|---|---|
| WO | WO 2004/001487 | 12/2003 |
| WO | WO 2004/001717 | 12/2003 |
| WO | WO 2004/109363 | 12/2004 |
| WO | WO 2004/109364 | 12/2004 |

* cited by examiner

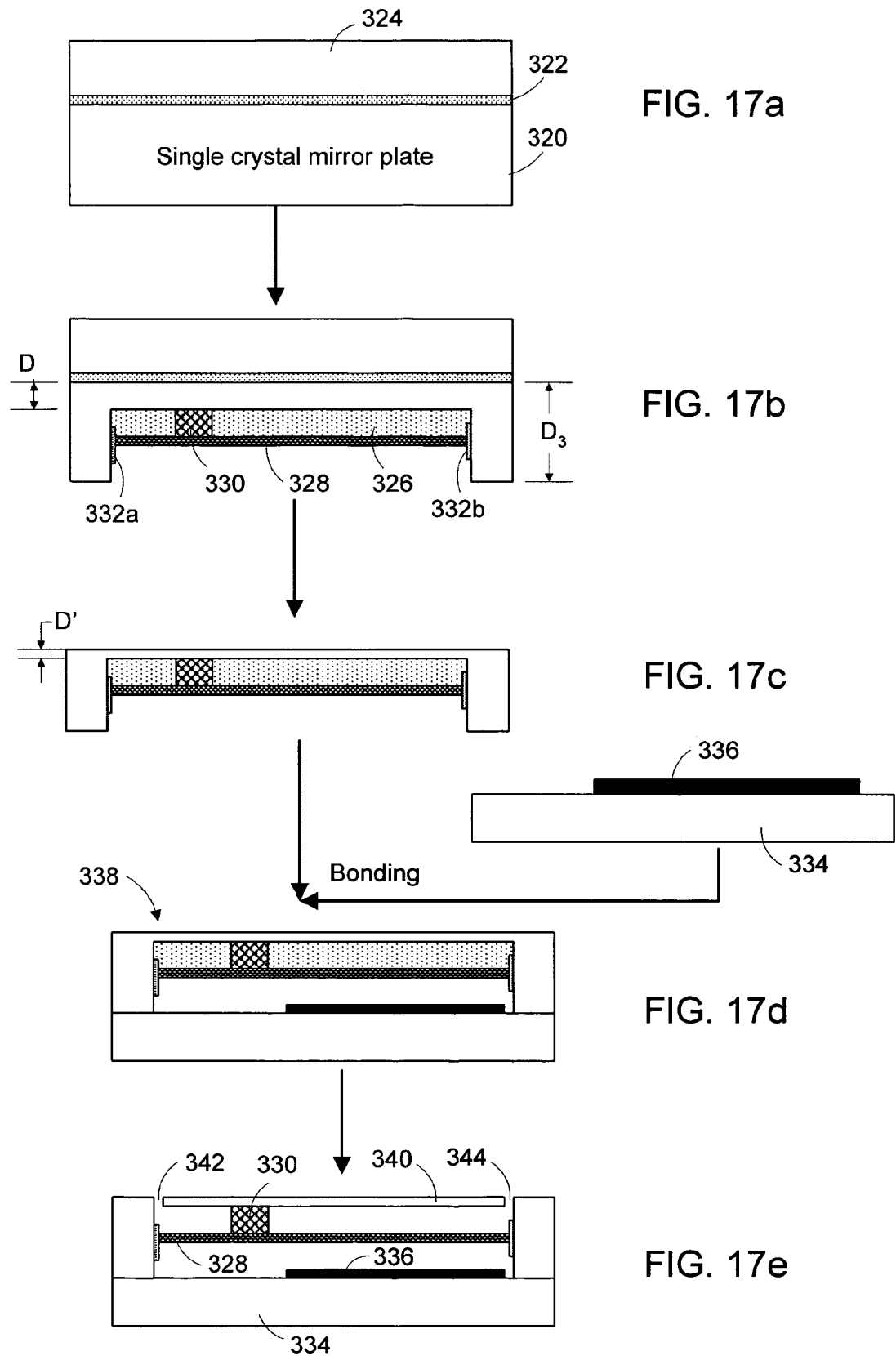

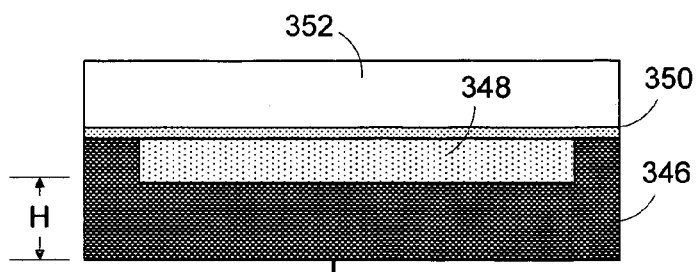
FIG. 18a
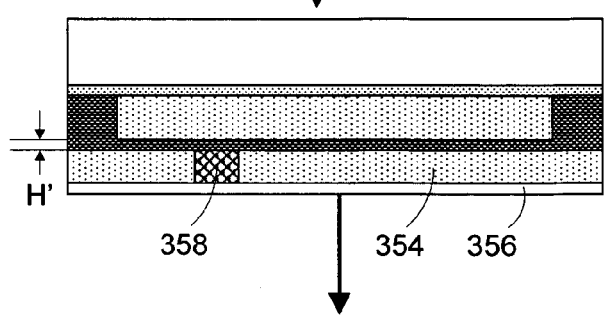
FIG. 18b
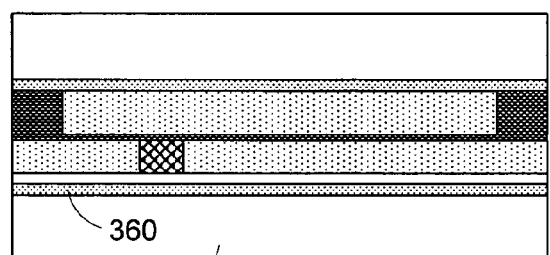
FIG. 18c
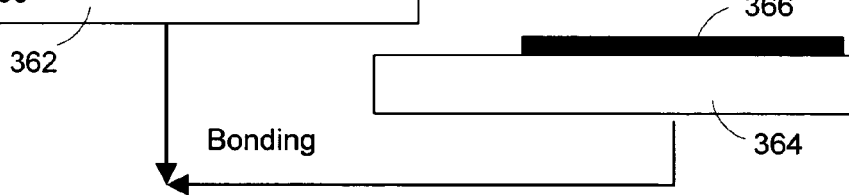
Bonding
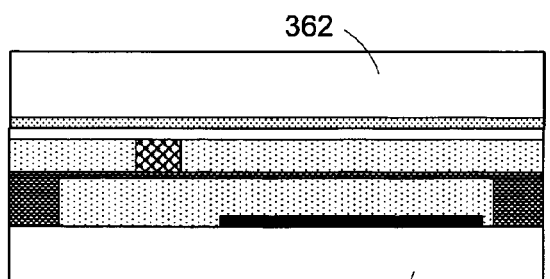
FIG. 18d
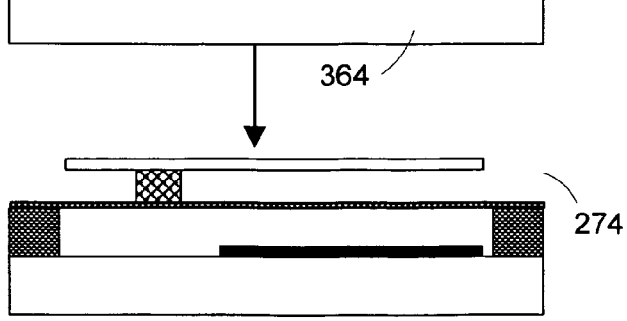
FIG. 18e

MICROMIRROR DEVICE AND METHOD FOR MAKING THE SAME

CROSS-REFERENCE TO RELATED APPLICATIONS

The present invention is a continuation-in-part of U.S. patent applications: a) Ser. No. 10/613,379 filed Jul. 3, 2003 now U.S. Pat. No. 6,873,450; b) Ser. No. 10/437,776 filed May 13, 2003 now U.S. Pat. No. 7,099,065; c) Ser. No. 10/698,563 filed Oct. 30, 2003 now U.S. Pat. No. 7,042,622; and Ser. No. 10/366,297 filed Feb. 12, 2003 now U.S. Pat. No. 6,867,897, the subject matter of each being incorporated herein by reference in entirety.

TECHNICAL FIELD OF THE INVENTION

The present invention is related generally to art of microelectromechanical devices, and, more particularly, to micromirror devices.

BACKGROUND OF THE INVENTION

Spatial light modulators (SLMs) are transducers that modulate an incident beam of light in a spatial pattern in response to an optical or electrical input. The incident light beam may be modulated in phase, intensity, polarization, or direction. This modulation may be accomplished through the use of a variety of materials exhibiting magneto-optic, electro-optic, or elastic properties. SLMs have many applications, including optical information processing, display systems, and electrostatic printing.

A SLM in which movable elements are addressed via electrical circuitry on a silicon substrate is described in K. Peterson, "Micromechanical Light Modulator Array Fabricated on Silicon" 31 Appl. Phys. Let. 521 (1977). This SLM contains a 16 by 1 array of cantilever mirrors above a silicon substrate. The mirrors are made of silicon dioxide and have a reflective metal coating. The space below the mirrors is created by etching away silicon via a KOH etch. The mirrors are deflected by electrostatic attraction: a voltage bias is applied between the reflective elements and the substrate and generates an electrostatic force. A similar SLM incorporating a two-dimensional array is described by Hartstein and Peterson, U.S. Pat. No. 4,229,732. Although the switching voltage of this SLM is lowered by connecting the deflectable mirror elements at only one corner, the device has low light efficiency due to the small fractional active area. In addition, diffraction from the addressing circuitry lowers the contrast ratio (modulation depth) of the display. A silicon-based micro-mechanical SLM with a large fractional optically active area is the Digital Mirror Device (DMD), developed by Texas Instruments and described by Hornbeck, U.S. Pat. No. 5,216,537 and other references.

Therefore, what is needed is a spatial light modulator that has a high resolution, a high fill factor, and a high contrast ratio.

SUMMARY OF THE INVENTION

In view of the foregoing, the present invention provides a micromirror device with an out-of-plane deformable hinge. The objects and advantages of the present invention will be obvious, and in part appear hereafter and are accomplished by the present invention. Such objects of the invention are achieved in the features of the independent claims attached hereto. Preferred embodiments are characterized in the dependent claims.

In one example of the invention, the micromirror comprises a deflectable and reflective mirror plate made from single crystal silicon. The mirror plate is attached to a deformable hinge positioned beneath the mirror plate relative to the incident light. The deformable hinge is affixed and thus held by posts and connected to the single crystal silicon. For deflecting the mirror plate, an addressing electrode is placed proximate to the mirror plate such the mirror plate can be deflected by an electrostatic force derived from an electrostatic field established between the mirror plate and addressing electrode.

In another example of the invention, the micromirror comprises a deflectable and reflective mirror plate that is thin film deposited by deposition techniques. The mirror plate is attached to a deformable hinge made from single crystal silicon. The deformable hinge is affixed and thus held by posts made from the same single crystal silicon for the deformable hinge or by thin film deposited posts. For deflecting the mirror plate, an addressing electrode is positioned proximate to the mirror plate such that the mirror plate can be rotated by an electrostatic force derived from an electrostatic field established between the mirror plate and addressing electrode.

In yet another example of the invention, the micromirror comprises a deflectable reflective mirror plate and a deformable hinge to which the mirror plate is attached in a way such that the mirror plate can rotate in response to an electrostatic force derived from an electrostatic field between the mirror plate and addressing electrode. One or both of the mirror plate and addressing electrode are made from single crystal silicon.

In any examples of the invention, the mirror plate can be attached to the deformable hinge such that the mirror plate is operable to rotate asymmetrically. That is, the mirror plate is operable to rotate to a larger angle in one direction than in the opposite.

BRIEF DESCRIPTION OF THE DRAWINGS

While the appended claims set forth the features of the present invention with particularity, the invention together with its objects and advantages, may be best, understood from the following detailed description taken in conjunction with the accompanying drawings of which:

FIG. 17a to FIG. 1 7e are cross-section views of a micromirror in an exemplary fabrication process;

FIG. 18a to FIG. 18e are cross-section views of a micromirror in another exemplary fabrication process;

DETAILED DESCRIPTION OF THE INVENTION

The micromirror device of the present invention comprises a deflectable and reflective mirror plate that is connected to a deformable hinge located in a different plane of the deflectable and reflective mirror plate. The mirror plate is operable to rotate at a rotation axis that can be parallel to but offset from a diagonal of the mirror plate. Either one or both of the mirror plate and the mirror plate are single crystal silicon.

The micromirror device of the present invention can be implemented in many applications, such as display systems, optical switches and other information optical information processing and storing systems. In the following, the present invention will be discussed with reference to micromirror devices for use in display systems. It will be appreciated by those skilled in the art that the following discussion is for demonstration purposes only, and should be interpreted as a limitation. Rather, other variations without departing from the spirit of the invention are also applicable.

Figure 1:
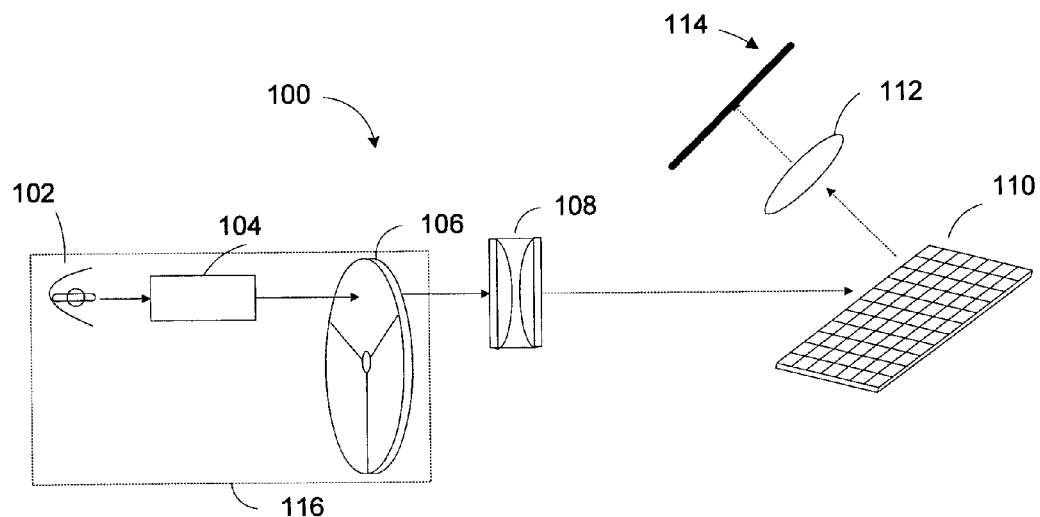
FIG. 1 demonstratively illustrates a display system in which embodiments of the invention can be implemented.

Turning to the drawings, an exemplary micromirror based display system is illustrated in FIG. 1. In its basic configuration, display system 100 comprises illumination system 116 for producing sequential color light, spatial light modulator 110, optical element 108 for directing illumination light from the illumination system onto the spatial light modulator, and optical element 112 that projects the reflected illumination light onto display target 114.

Illumination system 101 further comprises light source 102, which can be an arc lamp, lightpipe 104 that can be any suitable integrator of light or light beam shape changer, and color filter 106, which can be a color wheel. The filter in this particular example is positioned after light pipe 104 at the propagation path of the illumination light. In another example, the color filter can be positioned between the light source and light pipe 104, which is not shown in the figure. More complex display systems are also applicable, especially those having more than one spatial light modulators for color images, such as the display system in FIG. 2.

Figure 2:
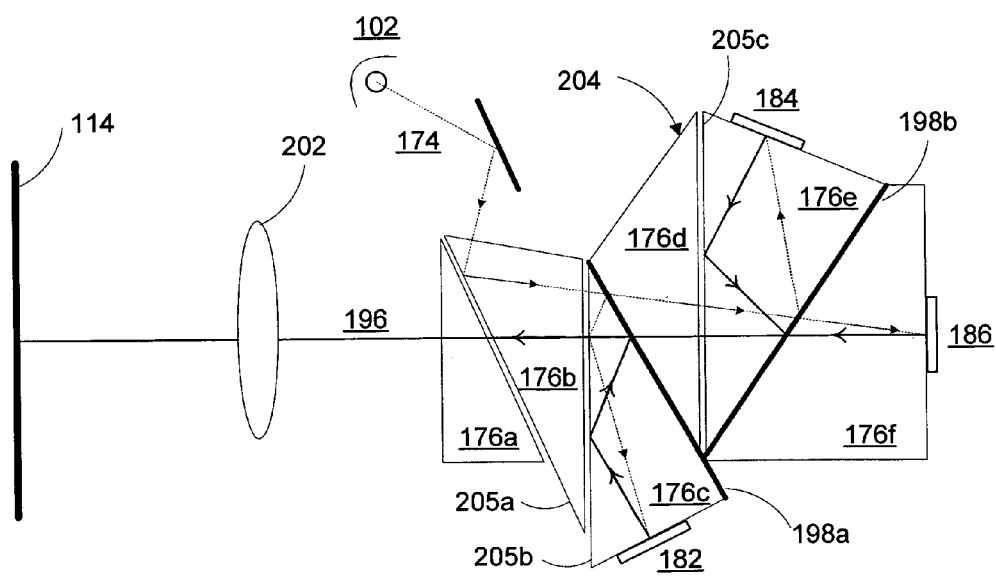
FIG. 2 demonstratively illustrates another display system in which embodiments of the invention can be implemented.

Referring to FIG. 2, another exemplary display system employing three spatial light modulators, each comprising an array of micromirrors and being designated for respectively modulating the multi-color (e.g. three color such as red, green and blue) light beams, is presented therein. The display system employs a dichroic prism assembly 204 for splitting incident light into three primary color light beams. Dichroic prism assembly comprises TIR 176a, 176c, 176d, 176e and 176f. Totally-internally-reflection (TIR) surfaces, i.e. TIR surfaces 205a, 205b and 205c, are defined at the prism surfaces that face air gaps. The surfaces 198a and 198b of prisms 176c and 176e are coated with dichroic films, yielding dichroic surfaces. In particular, dichroic surface 198a reflects green light and transmits other light. Dichroic surface 198b reflects red light and transmits other light. The three spatial light modulators, 182, 184 and 186, each having a micromirror array device, are arranged around the prism assembly.

In operation, incident white light 174 from light source 102 enters into TIR 176a and is directed towards spatial light modulator 186, which is designated for modulating the blue light component of the incident white light. At the dichroic surface 198a, the green light component of the totally internally reflected light from TIR surface 205a is separated therefrom and reflected towards spatial light modulator 182, which is designated for modulating green light. As seen, the separated green light may experience TIR by TIR surface 205b in order to illuminate spatial light modulator 182 at a desired angle. This can be accomplished by arranging the incident angle of the separated green light onto TIR surface 205b larger than the critical TIR angle of TIR surface 205b. The rest of the light components, other than the green light, of the reflected light from the TIR surface 205a pass through dichroic surface 198a and are reflected at dichroic surface 198b. Because dichroic surface 198b is designated for reflecting red light component, the red light component of the incident light onto dichroic surface 198b is thus separated and reflected onto spatial light modulator 184, which is designated for modulating red light. Finally, the blue component of the white incident light (white light 174) reaches spatial light modulator 186 and is modulated thereby. By collaborating operations of the three spatial light modulators, red, green, and blue lights can be properly modulated. The modulated red, green, and blue lights are recollected and delivered onto display target 114 through optic elements, such as projection lens 202, if necessary.

The spatial light modulator, in general, comprises an array of hundreds, thousands or millions of micromirrors, the total number of which determines the resolution of the displayed images. For example, the micromirror array of the spatial light modulator may have 1024×768, 1280×720, 1400×1050, 1600×1200, 1920×1080, or even larger number of micromirrors. In other applications, such as optical switching, the micromirror array may have less number of micromirrors.

Figure 3:
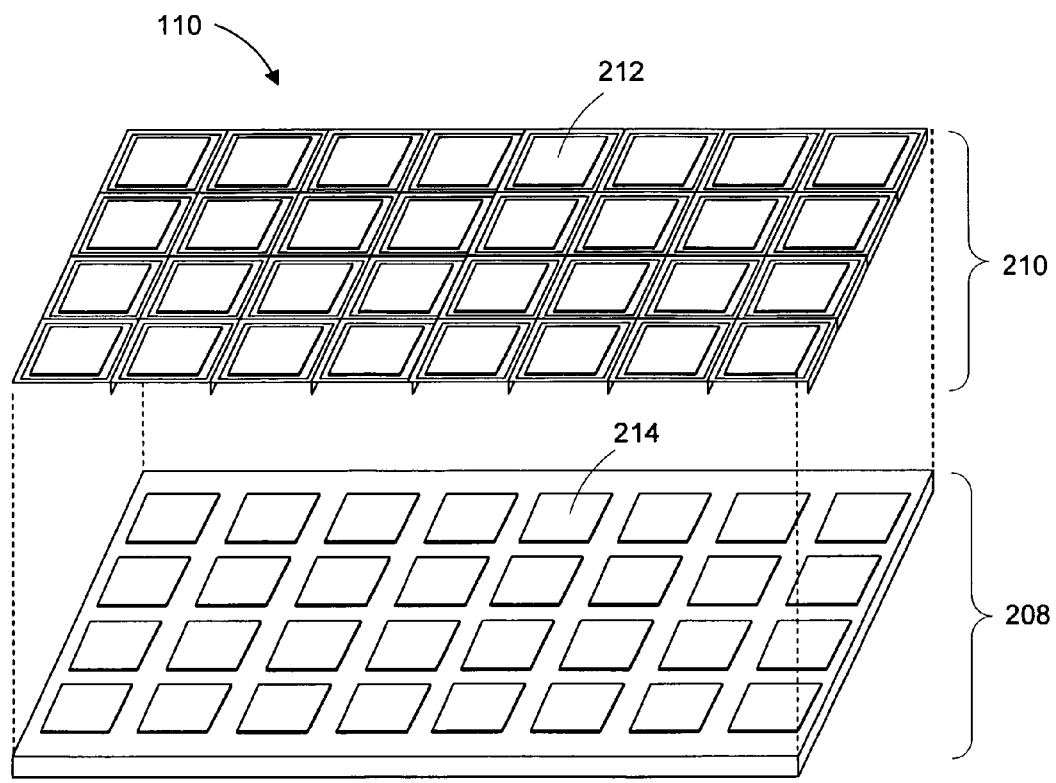
FIG. 3 demonstratively illustrates the spatial light modulator of FIG. 1 or FIG. 2 having a micromirror substrate and an addressing electrode substrate before bonding.

FIG. 3 illustrates a perspective view of the spatial light modulator having micromirror substrate 210 and addressing electrode substrate 208 before being bonded together. The micromirror substrate comprises an array of micromirrors each having a deflectable and reflective mirror plate; and the addressing electrode substrate comprises an array of addressing electrodes each being associated with one mirror plate of the micromirror array for deflecting the mirror plate. For simplicity purposes, only 4×8 micromirrors and addressing electrodes are presented therein. Formed on the addressing electrode substrate may also be an array of circuits, such as memory cells, each having a voltage output node connected to the addressing electrode such that the voltage on the addressing electrode can be controlled according to the voltage signal stored in the memory cell. In display applications, the voltage signal stored in the memory cell can be image data, such as bitplane data of desired image, produced by a pulse-width-modulation technique.

For achieving a high resolution and optical efficiency while maintaining the same dimension of the micromirror array so as to be compatible with commonly used light source, such as arc lamps which often has small arc sizes (e.g. 1.0 mm or shorter), the micromirror array preferably has certain dimensions as set forth ion U.S. patent application Ser. No. 10/627,303 filed Jul. 29, 2003, the subject matter being incorporated herein by reference. For example, the micromirror array preferably has a pitch of 10.16 micrometers or less or from 4.38 to 10.16 micrometers with the pitch defined as the distance between adjacent micromirrors in the micromirror array. The gap between adjacent micromirrors is preferably 0.5 micrometers or less, or from 0.1 to 0.5 micrometer.

Figure 4:
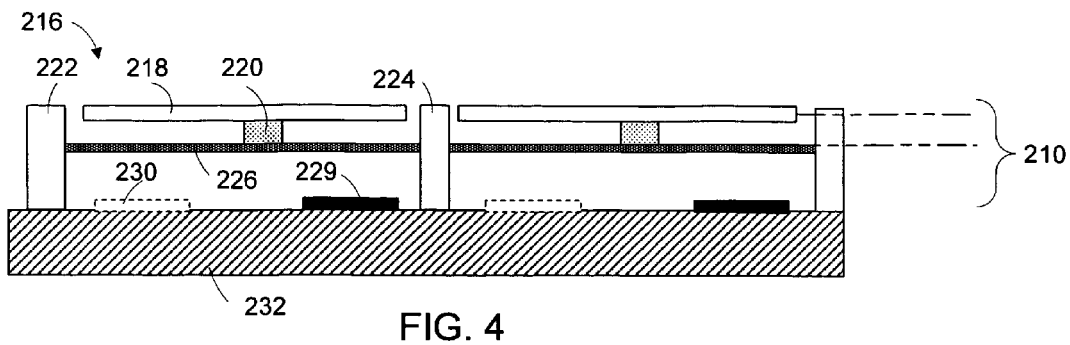
FIG. 4 is a cross-section view of two adjacent micromirrors of the micromirror array in FIG. 3 according to an embodiment of the invention.

A cross-section view of the bonded micromirror substrate and addressing electrode substrate is illustrated in FIG. 4 in accordance with an embodiment of the invention is illustrated therein. Referring to FIG. 4, the bonded micromirror and addressing electrode substrate forms an array of micromirror devices, such as micromirror device 216. For simplicity purposes, only two adjacent micromirror devices are presented therein. The representative micromirror device 216 comprises deflectable reflective mirror plate 218 and deformable hinge 226. The mirror plate is attached to the deformable hinge via hinge contact 220, and positioned at a different plane of the hinge. Specifically, a gap is formed between the mirror plate and hinge. In another word, the planes of the mirror plate and deformable hinge when the mirror plate is not deflected are spaced apart as illustrated in dashed lines in the figure; and the distance therebetween is defined by the vertical height of hinge contact 220. The deformable hinge is affixed to and thus held by posts 222 and 224. The posts are connected to substrate 232 on which addressing electrode 229 for addressing and deflecting the mirror plate is provided. As an aspect of the embodiment, the distance between the addressing electrode and mirror plate, which determines the strength of the electrostatic force achievable for a given electric voltage difference therebetween, is defined by the height of the posts. In fabricating the micromirror, the height of the posts are made according to the designed strength of the electrostatic force sufficient to rotate the mirror plate to the desired ON and/or OFF state angle with other parameters otherwise given.

In the embodiment of the invention, the mirror plate is derived from a single crystal, such as one single crystal silicon, while the deformable hinge may or may not be a single crystal. If a single crystal with unsatisfying electric conductivity is used for the mirror plate, an electric conductive layer will be deposited on the mirror plate so as to enable the establishment of the electrostatic field between the mirror plate and addressing electrode. Such electric conducting coat can be deposited on either surface of the mirror plate, and the electric conducting coats of the micromirrors in the array are preferably connected together such that the mirror plates of the micromirrors in the array can be at the same electric potential during operation. An advantage of such configuration lies in simplification of the device design and operation. When such electric conducting coat is on the reflecting surface of the mirror plate, it is preferably transparent to the incident light. If the reflecting surface of the single crystal has a low reflectivity to the incident light, such as a reflectivity lower than 99%, 85%, or 80%, a light reflecting film may be formed on the reflecting surface of the single crystal mirror plate. Preferably, an aluminum, gold, or silver film is deposited on the reflecting surface of the mirror plate.

In selecting the material for the light reflecting film and/or the electric conducting coat, other aspects, such as adhesive property, mechanical property, thermomechanical property of the coat and/or the film to the surface of the single crystal mirror plate are preferably included into consideration. Specifically, the film or coat is desired to match the reflective surface of the mirror plate in thermomechanical properties such that, the interface forces, such as the interface stress and/or compression force will not result in deformation of the coat and/or film and the mirror plate. The electric conducting film and/or the light reflecting coat may or may not be directly deposited on the surface(s) of the mirror plate. Instead, either one can be deposited on one or more additional intermediate layers that are directly deposited on the surface of the mirror plate for certain purposes.

As a way of example, the mirror plate can be a square having a characteristic dimension of 20 microns or less, or 16 microns or less, or 13.5 microns or less. Specifically, the mirror plate can be 13.5×13.5 square, or has a reflecting surface of 13.5×13.5 square. The mirror plate preferably has a thickness of 1.5 microns or less, or more preferably 1 micron or less, such as from 0.1 to 0.45 microns. The distance between the mirror plate and deformable hinge can be 2 microns or less, or 1.5 microns or less, or 1.0 micron or less, or from 0.1 to 0.5 microns or less, such as from 0.15 to 0.45 microns. The mirror plate may be spaced apart from the addressing electrode, preferably at a distance of 6 microns or less, such as 5 microns or less, or 3 microns or less, and more preferably from 1 to 5 microns. The geometric dimension of the deformable hinge is determined based on the designed mechanical properties and the material selected for the deformable hinge. For example, the hinge may have a width (the characteristic dimension of the cross-section made perpendicular to the length of the deformable hinge) of 0.8 microns or less, such as 0.7 microns or less, or 0.5 microns or less, or more preferably from 0.1 to 0.7 microns. The length of the deformable hinge can be 5.5 microns, or 4.5 microns.

In this particular example, the deformable hinge is located between the addressing electrode and the reflective deflectable mirror plate, forming respective gaps therebetween, the deformable hinge is not exposed to the incident light. Such configuration is advantageous in depressing undesired light scattering from the hinge, thus benefiting higher contrast ration.

In addition to addressing electrode 229 for addressing and deflecting mirror plate 218, another addressing electrode, such as addressing electrode 230 may also be provided for deflecting mirror plate 218 to rotate in a direction opposite to that motivated by addressing electrode 229. Because the two addressing electrodes are provided for rotating the mirror plate to different rotational directions along the same rotation axis, the two addressing electrodes are positioned at the opposite sides of the rotation axis, as shown in the figure.

In the example as discussed above with reference to FIG. 4, the mirror plate is attached to the hinge such that the mirror plate rotates symmetrically—that is the ON and OFF state angles of the mirror plate have substantially the same absolute value, but in different directions. Such symmetrical rotation limits the maximum angle the mirror plate can achieve in one rotation direction. For achieving a larger maximum angle in a direction, such as the ON state angle, the mirror plate can be attached to the deformable hinge such that the mirror plate is operable to rotate asymmetrically, as illustrated in FIG. 5.

Figure 5:
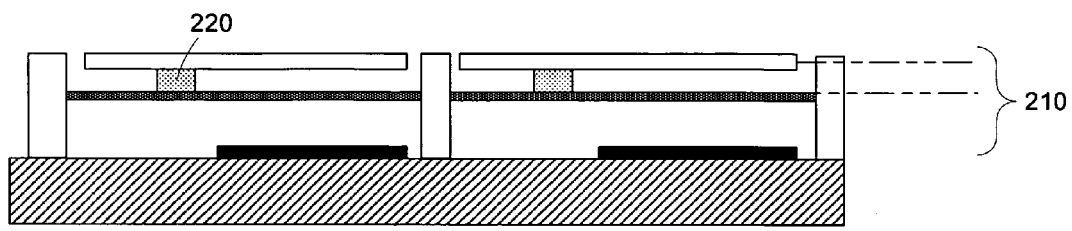
FIG. 5 is a cross-section view of two adjacent micromirrors of the micromirror array in FIG. 3 according to another embodiment of the invention.

Referring to FIG. 5, hinge contact 220 connects the mirror plate to the deformable hinge with the attachment point at the mirror plate being away from the center of the mirror plate. With this configuration, the mirror plate rotates to a larger maximum angle (e.g. the ON state angle) in one direction than the maximum angle in the opposite direction. As a way of example, the ON state angle of the mirror plate can be 12° degrees or higher, such as 14° degrees or higher, or 16° degrees or higher. The separation of the reflected light cones from the mirror plate at the ON and OFF states, thus the contrast ratio of the display system can be improved, as described in U.S. patent application Ser. No. 10/366,296 to Patel, filed Feb. 12, 2003, the subject matter being incorporated herein by reference.

The asymmetrically rotating mirror plate is addressed and deflected by an addressing electrode associated with the mirror plate, as shown in the figure. The distance between the addressing electrode and the mirror plate is set such that sufficient electrostatic force can be derived from the electrostatic field established between the mirror plate and the addressing electrode for rotating the mirror plate to the maximum rotation angle (e.g. the ON state angle). This distance is mechanically determined by the heights of the posts and the height of the hinge contact (the distance between the mirror plate and deformable hinge.

In the embodiment of the invention, only one single electrode is preferably provided for addressing and deflecting the mirror plate associated therewith. This addressing electrode is connected to a memory cell, such as a DRAM cell or a charge-pump-memory cell, on the semiconductor substrate (e.g. substrate 232 in FIGS. 4 to 7). A charge-pump-memory cell is a memory cell comprises a MOS-type transistor. The source of the transistor is connected to a bitline; and the gate of the transistor is connected to a wordline. The drain of the transistor is connected to one plate of a capacitor whose another plate, however is connected to a charge-pumping single whose voltage signal varies over time during operations. The drain and the plate of the capacitor connected thereto form a voltage output node. The addressing electrode is then connected.

The voltage on the addressing electrode is controlled by the voltage signal stored in the memory cell connected to the addressing electrode. The voltage signal is determined by the image date of a pixel to which the micromirror corresponds. As an example, the image data can be a bitplane date produced by a pulse-width-modulation technique.

When only one electrode, such as the addressing electrode is provided for deflecting the mirror plate, an electrostatic force of a suitable magnitude from an electrostatic field is applied to the mirror plate at a time when the ON state is desired. With this force, the mirror plate rotates towards the ON state, and is stopped at the ON state by a stopping mechanism, such as the semiconductor substrate or a designated stopping mechanism. During the rotation course, deformation is accumulated in the deformable hinge; and the deformation results in a restoration torque that resists the rotation of the mirror plate towards the ON state. However, because the restoration torque is smaller in magnitude than the driving torque produced by the applied electrostatic force, the restoration torque can not balance the driving torque; and the mirror plate keeps on rotating towards the ON state. When the OFF state (e.g. a non-deflected state) is desired, the electrostatic field is removed, for example by reducing the voltage difference between the mirror plate and the addressing electrode to zero. The mirror plate then departs from the ON state and rotates wards the OFF state under the restoration torque.

For effectively deflecting the mirror plate, the provided addressing electrode is preferably positioned offset from the center of the mirror plate. Specifically, a virtual line connecting the geometric center of the addressing electrode and the geometric center of the mirror plate is not perpendicular to the surface of the mirror plate at a non-deflected state. Or such virtual line presents an angle to the surface of the addressing electrode (or the substrate on which the addressing electrode is positioned). The addressing electrode can further be positioned such that the addressing electrode has a portion extending beyond the furthest point of the addressing electrode from its geometric center, as set forth in U.S. paten application "Micromirror Having Offset Addressing Electrode" to Patel, which claims priority from U.S. provisional application Ser. No. 60/582,446 filed on Jun. 23, 2004, the subject matter of each being incorporated herein by reference. In another example, the addressing electrode can be extended beyond the mirror plate associated therewith and into the area beneath the gap between the adjacent mirror plate, or even into the area beneath the adjacent mirror plate.

Figure 6:
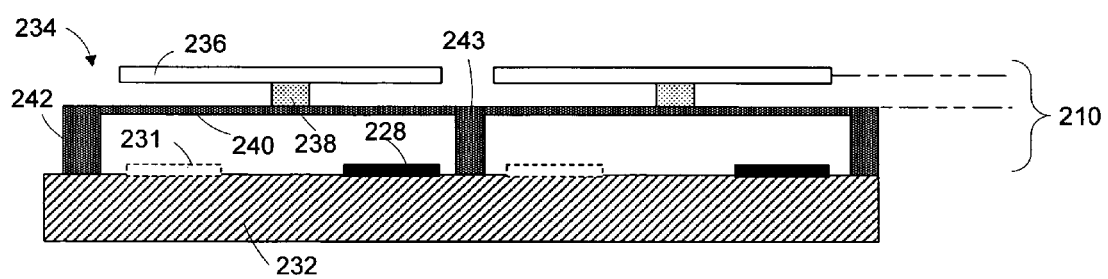
FIG. 6 is a cross-section view of two adjacent micromirrors of the micromirror array in FIG. 3 according to yet another embodiment of the invention.

Other than forming the post and posts from a single crystal as discussed above, the deformable hinge can be derived from a single crystal as illustrated in FIG. 6. Referring to FIG. 6, two adjacent micromirrors of an array of micromirrors are illustrated therein. For simplicity and demonstration purposes, only two micromirrors are shown. However, the micromirror array may comprise hundreds of millions of micromirrors, which depends upon the desired resolution. As an example, micromirror 234 comprises deformable hinge 240 held by posts 242 and 243. Deflectable and reflective mirror plate 236 is attached to the deformable hinge via hinge contact 238. Addressing electrode 228 is provided for deflecting the mirror plate. As an optional feature, electrode 231 can also be provided for deflecting the mirror plate along a direction opposite to that activated by addressing electrode 228.

According to the embodiment, the deformable hinge and posts are formed from a single crystal, such as silicon. The mirror plate can be a thin film, such as a film having a thickness from 0.1 to 0.45 microns. The addressing electrode is formed on substrate 232, which is preferably a standard semiconductor wafer on which integrated circuits can be fabricated.

Figure 7:
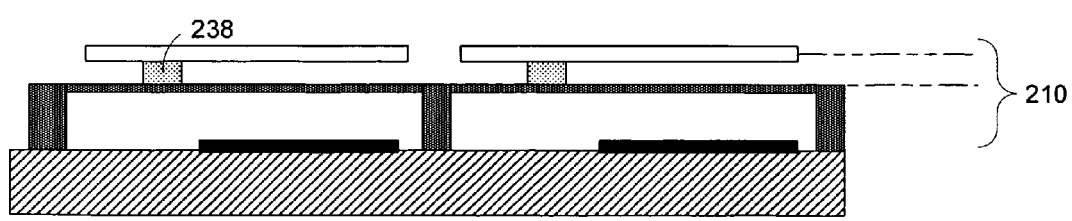
FIG. 7 is a cross-section view of two adjacent micromirrors of the micromirror array in FIG. 3 according to yet another embodiment of the invention.

In the example as shown in FIG. 6, the mirror plate is attached to the deformable hinge such that the mirror plate is operable to rotate symmetrically—that is the maximum angles achievable by the mirror plate rotating in opposite directions have substantially the same absolute value. Alternatively, for improving the separation of the reflected light cones from the ON and OFF states, and thus the contrast ratio, the mirror plate can be attached to the deformable hinge such that the mirror plate is operable to rotate asymmetrically—that is the mirror plate can rotate to a larger angle in one rotation direction than the angle in the opposite direction. This asymmetric rotation is accomplished by attaching the mirror plate to the deformable hinge such that the attachment point of hinge contact 238 to the mirror plate is away from the center of the mirror plate, as shown in FIG. 7. The rotation axis of the mirror plate is away from a diagonal of the mirror plate. However, the rotation axis may or may not be parallel to the diagonal of the mirror plate.

Because the attachment point, thus the axis of rotation is moved away from the center and the diagonal of the mirror plate, a larger area of the mirror plate can be exposed to the addressing electrode and moves towards the addressing electrode in the presence of an electrostatic field. This enabling provision of a larger addressing electrode for more effectively deflecting the mirror plate. The deflecting efficiency can be further improved by positioning the addressing electrode away from the center of the mirror plate, as discussed with reference to the addressing electrode in FIG. 4, which will not be discussed in detail herein. Same to the micromirror in FIGS. 4 and 5, the mirror plate and the hinge are spaced apart and are formed on separate planes. Specifically, the deformable hinge is formed underneath the mirror plate in the direction of the incident illumination light. Therefore, the portion of the deformable hinge exposed to the illumination light can be minimized so as to minimize undesired light scattering, thereby improves the contrast ratio.

In the examples discussed above with reference to FIGS. 4 through 7, the adjacent micromirrors may share the same post. That is, the adjacent mirror plates or the deformable hinges are supported and held by the same post, and use the same post to connect to the substrate, such as substrate 232. In an alternative example, not all micromirrors are provided with two posts, or one or more micromirrors even have no post directly connected thereto. For example, a micromirror in a micromirror array may have only one post to which the deformable hinge is directly connected. In another example, a micromirror in the micromirror array may have no post directly connected to the deformable hinge. Instead, the deformable hinge, and the mirror plate are indirectly connected to posts of other micromirrors in the micromirror array through, for example, interconnected hinges. In this instance, the hinges of at least a portion of the micromirrors are interconnected forming a hinge strip, a frame, and/or a segment of a frame, as set forth in U.S. patent application "A Micromirror Array Device and a Method for Making the Same" to Patel, attorney docket number P136-US, the subject matter being incorporated herein by reference.

In accordance with yet another embodiment of the invention, both mirror plate and deformable hinge are derived from single crystals. Specifically, the mirror plate is derived from a single crystal, while the deformable hinge is derived from another single crystal. The posts can be derived either along with the mirror plate or the deformable hinge, which will be discussed in detail afterwards with reference to FIGS. 21a to 21d.

The micromirrors of the array may have different configurations, as those illustrated in FIGS. 8 to 13, which will be discussed in detail in the following. It will be appreciated by those skilled in the art that the following examples are presented for demonstration purposes only, and should not be interpreted as a limitation. Rather, any variations without departing from the spirit of the invention are applicable. For example, the mirror plate of the micromirror preferably has four predominant sides (more preferably square), such as rectangle, square, rhombus or trapezoid. A four sided micromirror aids in "tiling" the mirrors together so as to minimize gaps and other non-reflective areas. The four predominant sides can define two diagonals. A line between the centers of any two of the plurality of posts is not coincident with either of the two diagonals. Whether the micromirror is a rectangle, square, rhombus or trapezoid, even if the corners are rounded or "clipped" or if an aperture or protrusion is located on one or more of the sides of the micromirror, it is still possible to conceptually connect the four major sides of the micromirror shape and take a diagonal across the middle of the micromirror. In this way, a center diagonal can be defined even if the micromirror plate is substantially a rhombus, trapezoid, rectangle, and square. The mirror plate of the micromirror of course may have other suitable shapes, even though some shapes are disadvantageous in contrast ratio but are benefit in other aspects.

Figure 8:
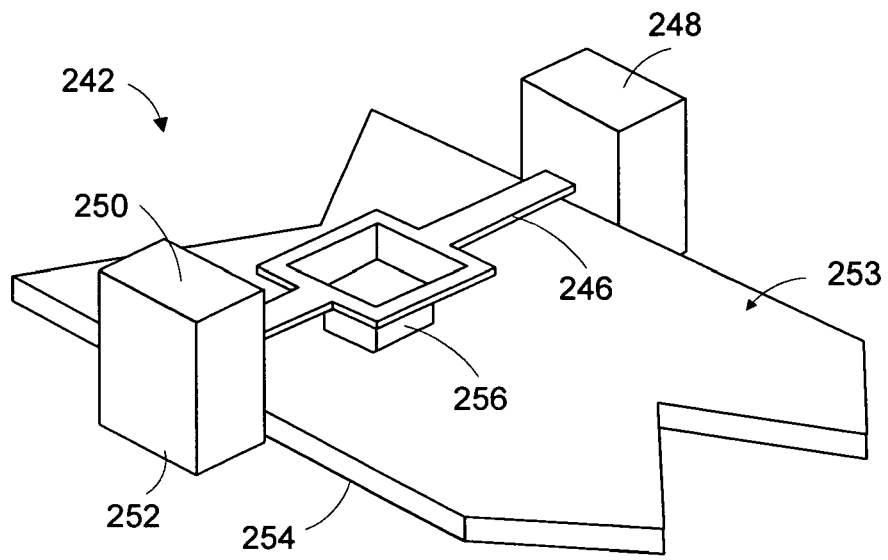
FIG. 8 shows a perspective view of an exemplary micromirror in accordance with the embodiment described in FIG. 5.

Referring to FIG. 8, a perspective view of a micromirror in accordance with the embodiment discussed above with reference to FIG. 5 is illustrated therein. Micromirror 242 comprises reflective mirror plate 253 attached to deformable hinge 246 via hinge contact 256 such that the mirror plate is operable to rotate along a rotation axis. Because the attachment point of the hinge contact to the mirror plate is away from the center of the mirror plate, the rotation axis is offset from a diagonal of the mirror plate when viewed from the top. However, the rotation axis may or may not be parallel to a diagonal of the mirror plate. The mirror plate in this example has zigzagged edges for benefiting reduction of undesired light scattering so as to improve the contrast ratio. The ends at the length of the hinge are affixed respectively to posts 252 and 248 such that the hinge, as well as the mirror plate is held above the addressing electrode (not shown in the figure). In this particular example, the mirror plate and the posts are preferably derived from a single crystal, such as silicon, whereas the hinge can be a film. The top surfaces of the posts, such as top surface 252 of post 250, are on the same plane of the reflecting surface (e.g. reflecting surface 254) of the mirror plate.

Figure 9:
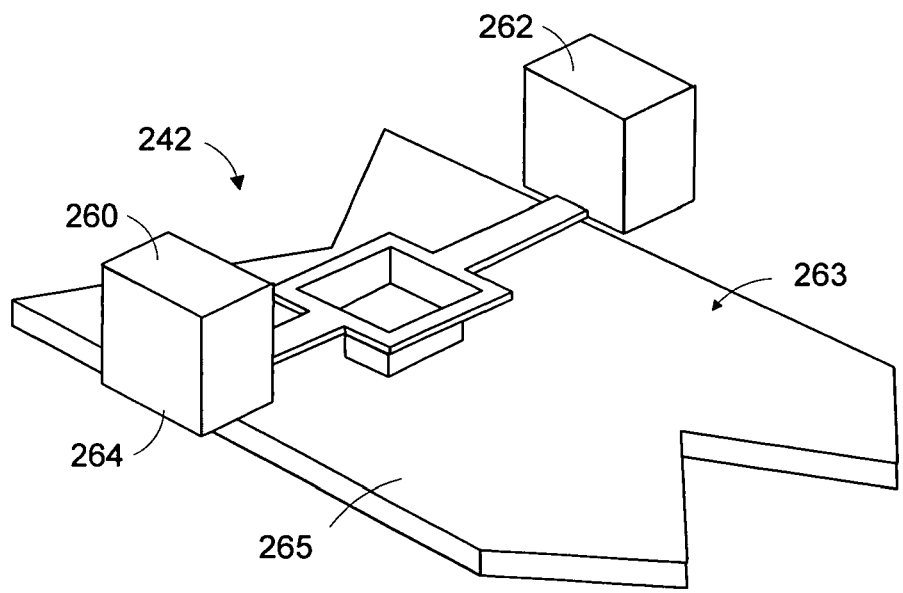
FIG. 9 shows a perspective view of an exemplary micromirror in accordance with the embodiment described in FIG. 7.

Other than forming the mirror plate and the posts from a single crystal, the hinge and the posts can be formed from a single crystal as discussed earlier with reference to FIGS. 6 and 7. As a way of example, FIG. 9 illustrates a perspective view of an exemplary micromirror in accordance with the embodiment discussed with reference to FIG. 7. Referring to FIG. 9, micromirror 242 comprises deformable a hinge attached to posts 260 and 262 with the deformable hinge and the posts being derived from a single crystal. A reflective and deflectable mirror plate 163 is attached to the deformable hinge via a hinge contact such that the mirror plate can rotate symmetrically (when the attachment point is around the center of the mirror plate) or asymmetrically (when the attachment point is away from the center of the mirror plate, as discussed in micromirror 242 shown in FIG. 8). The deformable hinge and the posts are derived from a single crystal; and the top surfaces of the posts (e.g. top surface 264 of post 260) are on the same plane of the surface (e.g. surface 265) opposite to the reflective surface of the mirror plate, as shown in the figure. The mirror plate in this example has zigzagged edges for reducing undesired light scattering.

In yet another example, the deformable reflective mirror plate, the deformable hinge, and the posts of a micromirror device may all be derived from single crystals. For example, they can be formed from two or more separate single crystals, such as silicon.

Figure 10:
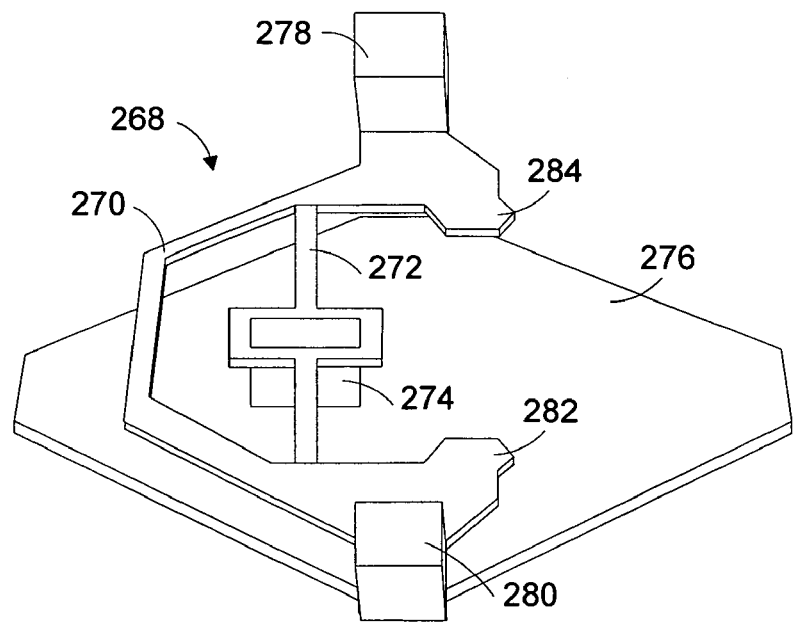
FIG. 10 shows a perspective view of another exemplary micromirror in accordance with the embodiment described in FIG. 5.

The micromirror may have other different configurations, such as those in FIGS. 10 to 13. Referring to FIG. 10, mirror plate 276 of micromirror 268 is substantially square with posts 278 and 280 being positioned at two opposite corners of the mirror plate. The mirror plate is attached to deformable hinge 272 via hinge contact 274. The hinge contact is preferably positioned away from the center of the mirror plate such that the rotation axis of the mirror plate is offset from a diagonal of the mirror plate—enabling the mirror plate to rotate asymmetrically above the addressing electrode (not shown in the figure). However, the rotation axis may or may not be parallel to a diagonal of the mirror plate. Alternatively, the attachment point can be located around the center of the mirror plate—allowing symmetrical rotation of the mirror plate.

Figure 11:
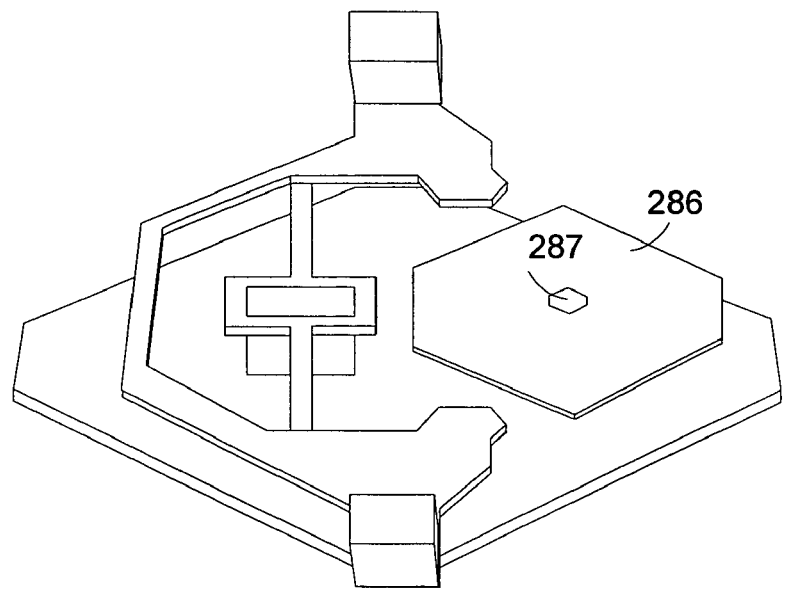
FIG. 11 shows a perspective view of yet another exemplary micromirror in accordance with the embodiment described in FIG. 5.

For improving the electrical coupling of the mirror plate to the addressing electrode, an extension plate 286 can be formed on the mirror plate, as shown in FIG. 11. Such extension plate is formed on the mirror plate and held on the mirror plate by post 287, as set forth in U.S. patent application Ser. No. 10/613,379 to Patel filed Jul. 3, 2003, the subject matter being incorporated herein by reference.

Figure 12:
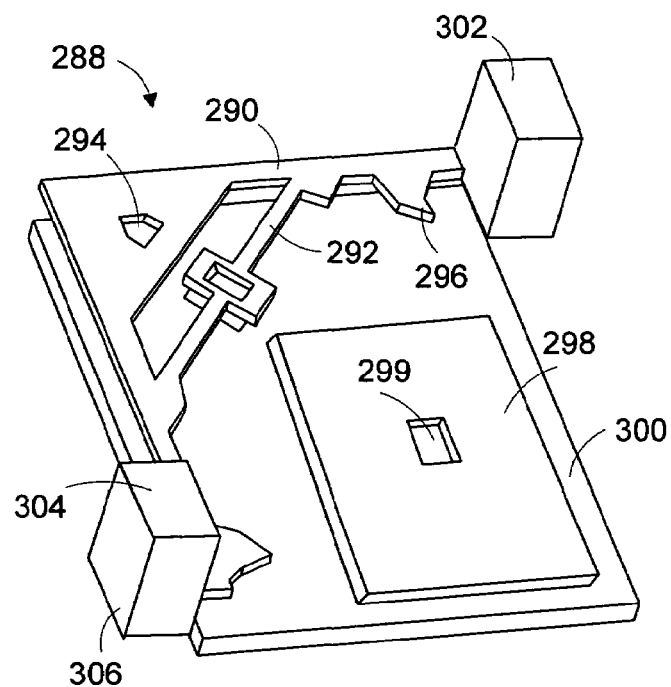
FIG. 12 shows a perspective view of yet another exemplary micromirror in accordance with the embodiment described in FIG. 5.

FIG. 12 illustrates another exemplary micromirror device according to an embodiment of the invention. Referring to FIG. 12, reflective and deflectable mirror plate 300 is attached to deformable hinge 292 via a hinge contact. The hinge contact is at a location that is away from the center of the mirror plate such that the rotation axis of the mirror plate is offset from either diagonal of the mirror plate—enabling asymmetrical rotation of the mirror plate. Of course, the mirror plate can be attached to the deformable hinge such that the mirror plate rotates symmetrically.

The opposite ends at the length of the deformable hinge is affixed to and thus held by hinge support 290. The hinge support is connected to and held by posts 302 and 304. In this example, the posts are positioned along the opposite edges of the mirror plate instead of on the opposite corners of the mirror plate. Specifically, a virtual line connecting the two posts is not parallel to either diagonal of the mirror plate, as set forth in U.S. patent application Ser. No. 10/698,563 filed Oct. 30, 2003, the subject matter being incorporated herein by reference.

The micromirror may have other features to improve its performance. For example, extension plate 298 can be formed on mirror plate 300 and connected to the mirror plate via post 299. The extension plate can be used to improve the electrical coupling of the mirror plate to the associated addressing electrode. The micromirror may also have stopping mechanisms 294 and 296. Stopper 296 defines the ON state angle, while stopper 294 defines the OFF state angle.

In this exemplary micromirror, either the mirror plate or the deformable hinge, or both are formed from single crystals. Specifically, the mirror plate and the posts can be derived from one single crystal such as a silicon crystal, while the deformable hinge can be a thin film. In another example, the deformable hinge and the posts can be derived from one single crystal, while the mirror plate is a thin film. In yet another example, the mirror plate, deformable hinge, and the posts are formed from separate single crystals.

Figure 13:
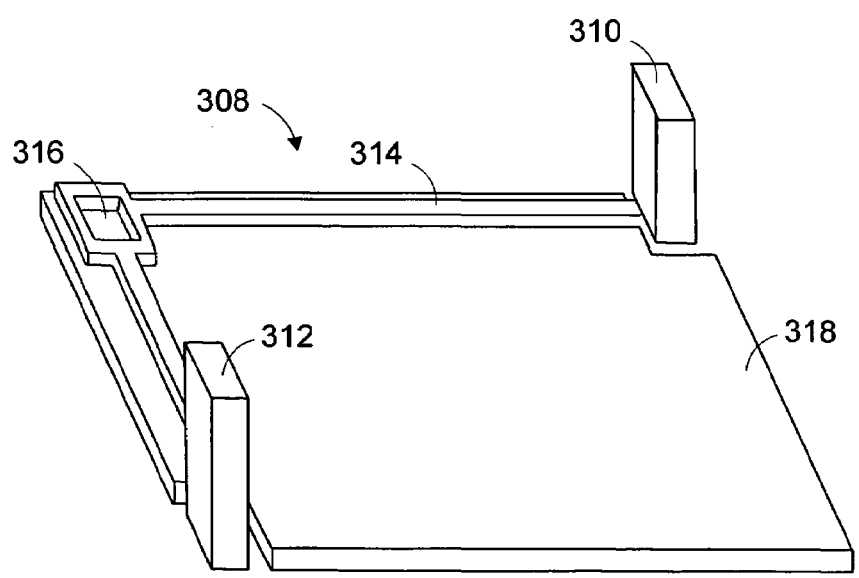
FIG. 13 shows a perspective view of yet another exemplary micromirror in accordance with the embodiment described in FIG. 5.

FIG. 13 present yet another exemplary micromirror according to the invention. The deflectable and reflective mirror plate 318 of micromirror 308 is substantially square in shape with two "clipped" opposite corners. Posts 310 and 312 are positioned within these two clipped corners as shown in the figures. Deformable hinge 314 stretches along the circumference of the mirror plate and connects to the mirror plate via hinge contact 316. The ends of the deformable hinge is affixed to and thus held by posts 310 and 312.

The micromirror can be made with the mirror plate and posts being derived from a single crystal, such as crystal silicon, and the deformable hinge being formed as thin film. Alternatively, the deformable hinge and the posts can be formed from a single crystal, while the mirror plate is formed as a thin film. As yet another example, the mirror plate and the deformable hinge both are formed from single crystals.

In the exemplary micromirrors illustrated in FIGS. 12 and 13, the deformable hinges are preferably formed on separate planes of the mirror plates and more preferably underneath the mirror plates in the direction of the incident illumination light. Because the deformable hinges are not exposed to the illumination light, undesired light scattering from the deformable hinge can be reduced.

Figure 14:
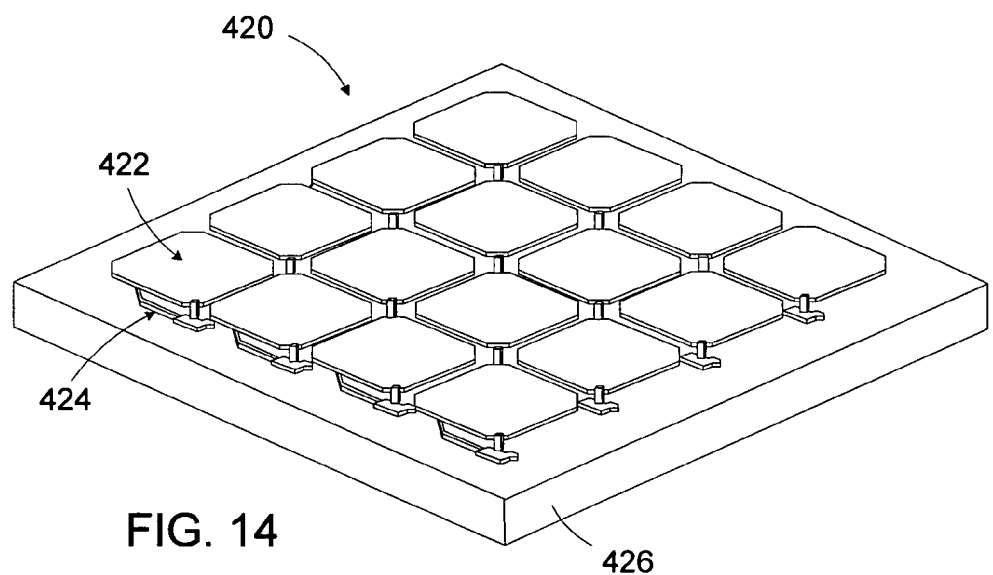
FIG. 14 illustrates a portion of an array of micromirror devices of FIC 10.

Referring to FIG. 14, a spatial light modulator having an array of micromirrors (e.g. micromirrors in FIGS. 10 and 11) is illustrated therein. For simplicity purposes, only 4×4 micromirrors are illustrated therein. Spatial light modulator 420 comprises micromirror array 422 each having a deflectable and reflective mirror plate. Addressing electrode array 424 on substrate 426 is positioned proximate to the micromirrors for addressing and deflecting mirror plates of the micromirrors.

Figure 15:
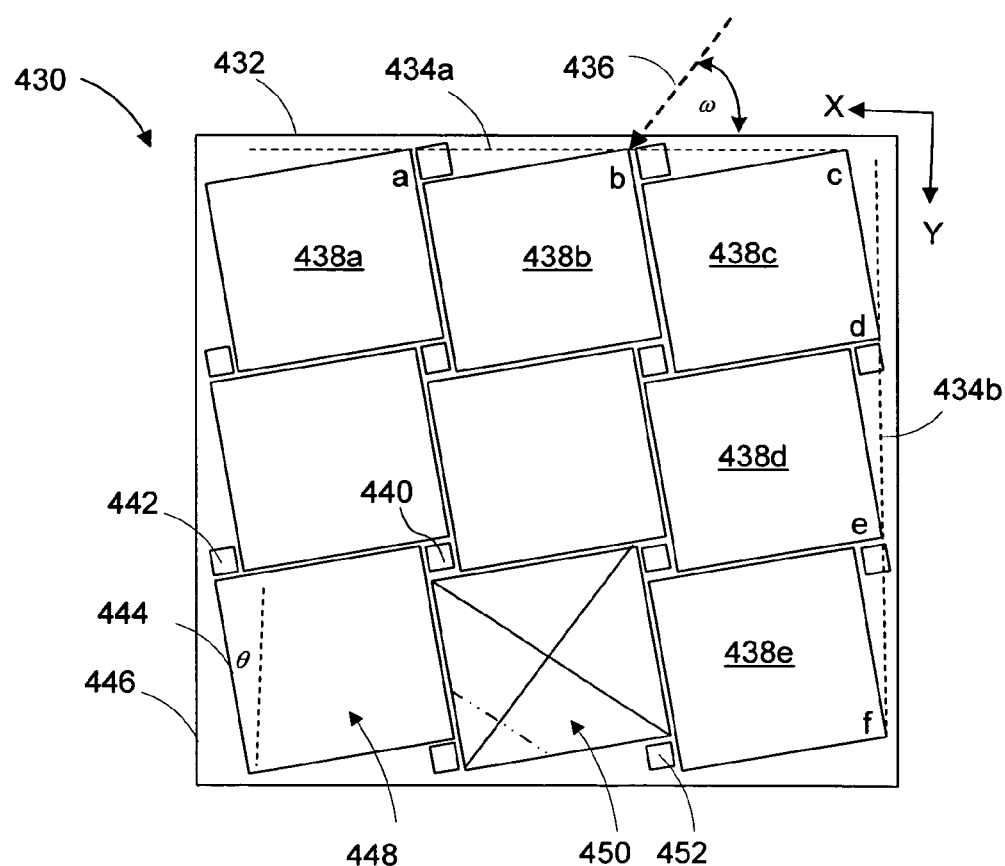
FIG. 15 is a top view of a portion of an array of micromirror devices of FIG. 12.

FIG. 15 illustrates an exemplary spatial light modulator comprising an array of micromirrors in FIG. 12. Referring to FIG. 15, each mirror plate (e.g. mirror plate 450) has four predominant sides and is held by posts 440 and 452. A four sided mirror plate is advantageous in for example "tiling" the mirror plates of the micromirrors in the array together so as to minimize gaps and other non-reflective areas therebetween. The four predominant sides define two diagonals, such as the diagonals plotted in solid lines in micromirror 450. A line between the centers of any two of the plurality of posts, such as a line between the centers of posts 440 and 452 in micromirror 450 is not coincident with either of the two diagonals. This is due to the fact that the posts that hingedly support the mirror plates are not at the direct corners of the micromirrors. By having the micromirrors "skewed" such that the posts are not at the direct corners of the mirror plats, both the mirror plates and posts can be "tiled" with maximum effect (minimizing non-reflecting areas), as set forth in U.S. patent application Ser. No. 10/857,132; Ser. No. 10/857,514; Ser. No. 10/856,174; Ser. No. 10/857,055; 10/857,133; Ser. No. 10/857,519; Ser. No. 10/857,058; and Ser. No. 10/857,059, both filed May 28, 2004, each of which is a continuation of U.S. patent Ser. No. 10/343,307 filed Jan. 29, 2003, which is U.S. National Phase of PCT/US01/24332 filed Aug. 3, 2001, which claims priority from Ser. No. 09/631,536 filed Aug. 3, 2000(now U.S. Pat. No. 6,529,310) and 60/229,246 filed Aug. 30, 2000, and Ser. No. 09/732,445 filed Dec. 7, 2000 (now U.S. Pat. No. 6,523,961), the subject matter of each being incorporated herein by reference.

In another way of describing this arrangement of the invention, the centers of the micromirrors in each row (the micromirrors disposed along the X-direction) are connected with an imaginary line, and the imaginary lines for all rows form a set of parallel imaginary lines along the X-direction. The centers of the micromirrors in each column (the micromirrors disposed along the Y-direction) are connected with another imaginary line, and all such imaginary lines form sets of parallel imaginary lines along the Y-direction. The imaginary lines along the X-direction are orthogonal to the imaginary lines along the Y-direction, and all imaginary lines form an orthogonal grid. Each one of the four predominant edges of each micromirror, however, is not parallel to an imaginary line of the grid.

The micromirror array is rectangular in shape as illustrated in FIG. 15. By "rectangular micromirror array", it is meant that a line (e.g. dotted line 434*a* in FIG. 15) connecting all equivalent points (e.g. points a, b and c in FIG. 15) of the micromirrors (e.g. micromirrors 438*a*, 438*b* and 438*c*) along the X direction (e.g. the X-direction in the X-Y Cartesian coordinate system illustrated in FIG. 15) is perpendicular or substantially perpendicular to a line (e.g. dotted line 434*b*)

connecting all equivalent points (e.g. points d, e and f) of the micromirrors (e.g. micromirrors 438c, 438d and 438e) along the Y direction of the X-Y Cartesian coordinate system. Each micromirror has four predominant sides, wherein each side is neither parallel nor perpendicular to the edges of the rectangular micromirror array. For example, edge 444 of micromirror 448 has an angle θ with the edge of the micromirror array, wherein the angle θ is neither 0° nor (n·90)° (n is an integer number) degrees. In the present invention, the angle θ can be an angle from 2° to 30°, though more likely within the range of from 5° to 25° degrees, (e.g. from 10° to 20° degrees, or around 13° degrees).

Angle θ relates to the ratio of the width of the mirror plate to the width of the post. For example, assuming both of the post and mirror plate are square, angle θ can then be written as: $ctg\theta=(m/p-1)$, wherein m is the width of the mirror plate and p is the width of the post. Corresponding to the preferred range of angle θ from 2° to 30°, the ratio of m/p ranges from 0.7 to 27.6.

In operation, incident light beam 436 has an angle φ relative to the micromirror array plane, and the angle between the projection of the incident light on the micromirror array plane and the edge (e.g. edge 432) of the micromirror array is represented by ω, as shown in the figure. The incident angle φ is preferably from 50° to 70° degrees. Angle ω relative to edge 320 of the micromirror array is preferably from 50° to 65° degrees.

Figure 16A:
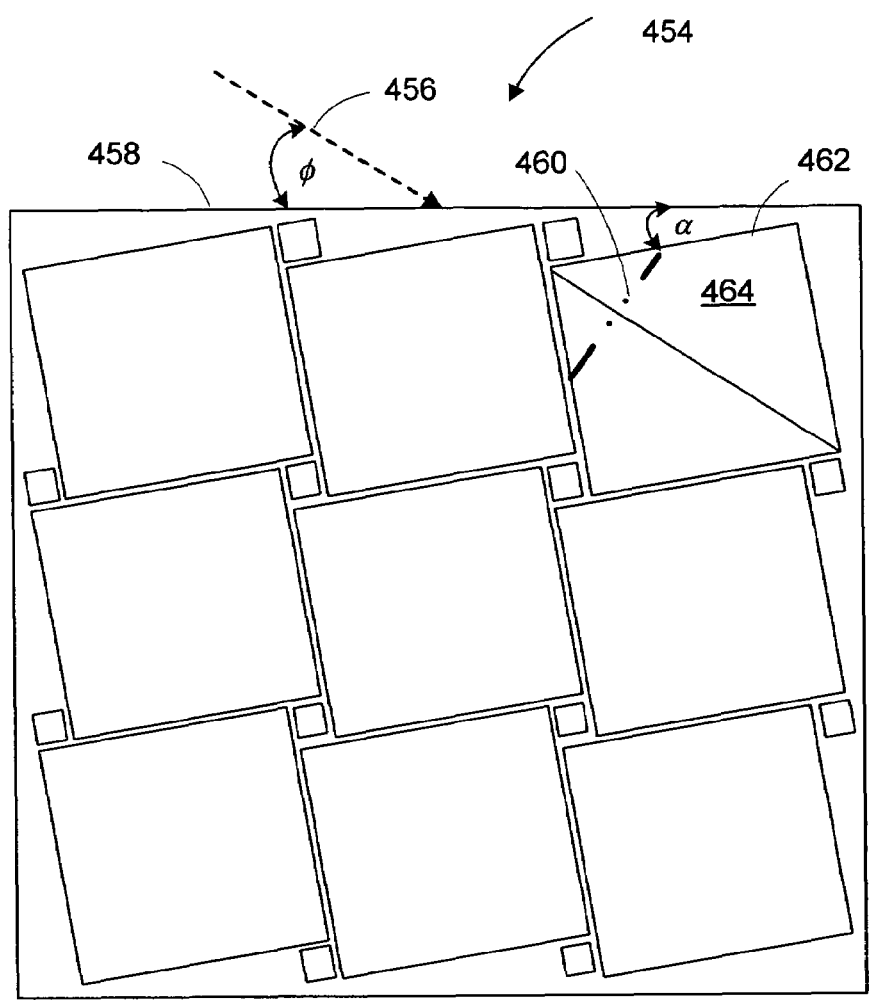
FIG. 16a is a top view of a portion of another array of micromirror devices of FIG. 12.
Figure 16B:
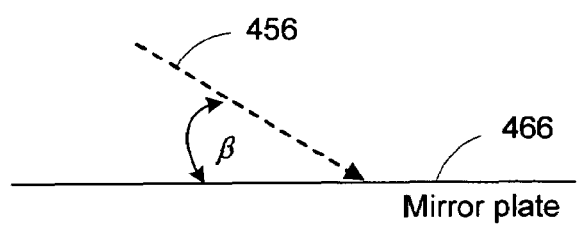
FIG. 16b demonstrates the incident angle of the illumination light to the reflecting surface of the micromirror.

FIG. 16a illustrates another spatial light modulator comprising an array of micromirrors in FIG. 12. Each micromirror of the micromirror array is tilted along an axis passing through its geometric center and perpendicular to the reflecting surface of the mirror plate, resulting in angle α between an edge of the mirror plate and the edge of the micromirror array, such as angle α between mirror plate edge 462 and edge 458 of the micromirror array. In operation, illumination light 456 is directed along the diagonal of the mirror plate, presenting angle φ between the edge (e.g. edge 458) of the micromirror array and the projection of the incident light on the reflecting surface of the mirror plate. Angle β between the illumination light and the reflecting surface (e.g. reflecting surface 466) of the mirror plate is illustrated in FIG. 16b.

As a way of example, angle α can be from 5° to 30° degrees, such as from 10° degrees to 20° degrees, preferably around 12° degrees. Angle φ can be from 20° to 50° degrees, preferably around 33° degrees. Angle β is preferably determined upon the ON state angle $\theta_{ON}$ of the mirror plate in operation, which is preferably equal to $(90°-2\times\theta_{ON})$. For example, when $\theta_{ON}$ is 16° degrees, angle β is preferably 58° degrees.

FABRICATION EXAMPLE ONE

The micromirror device as discussed above can be fabricated in many ways. As a way of example, FIGS. 17a through 17e illustrate cross-sectional views of the exemplary micromirror as discussed with reference to FIG. 5 during an exemplary fabrication process according to the invention. Referring to FIG. 17a, mirror substrate 320 that is a single crystal, such as single crystal silicon is provided. Such single crystal is desired to be rigid and have low creep rate.

For securely handling the mirror plate during the fabrication, handling substrate 324 is provided and attached to the mirror substrate. The handling substrate will be removed afterwards, For simplifying the following removal of the handling substrate, protection layer 322 is disposed between the mirror substrate and handling substrate by depositing the protection layer before forming the handling substrate on the mirror substrate. The protection layer can be composed of an oxide material, such as silicon oxide, or other suitable materials, such as nitrides (e.g. $TiN_x$ and $SiN_x$).

The mirror substrate is then patterned to create a cavity in the bottom surface of the mirror substrate using for example photolithography. The cavity leaves a frame having a frame wall with a height $D_3$, and the bottom of the cavity has a thickness of D as illustrated in FIG. 17b. The dimension of the cavity is preferably 20 microns or less, such as 15 microns or less or 13 microns or less.

Sacrificial layer 326, such as amorphous silicon is then deposited within the cavity. The sacrificial layer can be other suitable materials, such as a polymer or polyimide, or polysilicon, silicon nitride, silicon dioxide, or a material selected from the group consisting of elemental early transition metal, metal alloy, metalloid, metal silicide and other suitable materials such as $WN_x$ and $TaN_x$. Preferred early transition metals are those elements in columns 4 through 6 (i.e. Ti, Zr, Hf, V, Nb, Ta, Cr, Mo and W). Exemplary metal alloys for the sacrificial layers are $W_xTa$, $W_xTi$, $W_xMo$ and $W_xCr$. Exemplary metalloids for the sacrificial layers are Si, Ge and SiGe. Exemplary metal silicides for the sacrificial layers are $WSi_x$, $TiSi_x$, $MoSi_x$, $ZrSi_x$, $CrSi_x$, $TaSi_x$ and $TiWSi_x$. Most preferred materials are Ti, Si, W, WN and compounds or alloys thereof depending upon the etchant selected.

If the first sacrificial layer is amorphous silicon, it can be deposited at 300-350° C. The thickness of the first sacrificial layer can be wide ranging depending upon the size of the micromirror device and desired maximum rotation angle of the mirror plate of the micromirror device. For example, the sacrificial layer may have a thickness of 0.5 micron or less, preferably from 0.15 to 0.45 micron. Alternatively, the distance between the mirror plate and the deformable hinge may have a larger value, such as from 0.5 to 1.5 microns, though a thickness of from 500 Å to 50,000 Å, preferably around 0.3 micron, is preferred. The first sacrificial layer may be deposited on the substrate using any suitable method, such as LPCVD or PECVD.

As an alternative feature of the embodiment, an anti-reflection layer (not shown) maybe deposited on the bottom surface of the substrate. Specifically, the anti-reflection film can be deposited between the sacrificial layer and the bottom surface of the cavity. The anti-reflection layer is deposited for reducing the reflection of the incident light from the surface of the substrate. Other optical enhancing layers may also be deposited on either surface of the glass substrate as desired. In addition to the optical enhancing layers, an electrical conducting layer can be deposited on a surface of the substrate. This electrical conducting layer can be used as an electrode for driving the mirror plate to rotate, especially to an OFF state. Moreover, a light blocking area may be deposited on the glass substrate as set forth in U.S. patent application Ser. No. 10,305,631 to Huibers, filed Nov. 26, 2002, the subject of each being incorporated herein by reference. The light area is deposited around the micromirrors in a form of frame, grid, strips or discontinuous segments such that light scattered from the edges or other structures than the mirror plates of the micromirror can be suppressed if not removable.

The deposited sacrificial layer is then patterned for forming hinge contact 330 using a standard lithography technique followed by etching. The etching step may be performed using $Cl_2$, $BCl_3$, or other suitable etchant depending upon the specific material(s) of the sacrificial layer.

Hinge contact layer is then deposited on the patterned sacrificial layer followed by patterning. According to an embodiment of the invention, the hinge contact comprises a $TiN_x$ layer deposited by PVD and a $SiN_x$ layer deposited by PECVD. Of course, other suitable materials and methods of deposition may be used (e.g. methods, such as LPCVD or sputtering).

After the deposition, the hinge contact layer is patterned into a desired configuration using etching with a suitable etchant. In particular, the hinge contact layer can be etched with a chlorine chemistry or a fluorine chemistry where the etchant is a perfluorocarbon or hydrofluorocarbon (or $SF_6$) that is energized so as to selectively etch the hinge support layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge support layer (e.g. chlorine chemistry for a metal layer, hydrocarbon or fluorocarbon (or $SF_6$) plasma for silicon or silicon compound layers, etc.).

After etching, the bottom segment of hinge contact 330 is removed and a portion of the bottom surface of the cavity is exposed. The exposed portions of the mirror plate will be used to form an electrical contact with external electric source.

On the pattered hinge support and sacrificial layer, hinge layer 328 is deposited and then patterned. In the embodiment of the invention, the hinge layer is electrically conductive. Examples of suitable materials for the hinge layer are Al, Ir, titanium, titanium nitride, titanium oxide(s), titanium carbide, $TiSiN_x$, $TaSiN_x$, or other ternary and higher compounds. When titanium is selected for the hinge layer, it can be deposited at 100° C. Alternatively, the hinge layer may comprise of multi-layers, such as 100Å $TiN_x$ and 400Å $SiN_x$.

The hinge may also comprise other suitable materials, such as nitride compound and a late transition metal. The nitride compound can be a nitride of silicon, boron or aluminum. The late transition metal is selected from the groups 8B or 1B of the periodic table, such as Co, Ni, Pd, Pt, Ag, and Au. Alternatively, the hinge may comprise a late transition metal and an element from groups 3A to 6A of the periodic table. The late transition metal and the element can be from groups 3A to 6A of the periodic table, as set forth in U.S. patent application Ser. No. 09/910,537 filed Jul. 20, 2001, the subject matter being incorporated herein by reference.

Following the deposition, the hinge layer is patterned using etching for forming the hinge (e.g. hinge 246 in FIG. 8 or hinge 272 in FIG. 10). The hinge layer can be etched with a chlorine chemistry or a fluorine chemistry where the etchant is a perfluorocarbon or hydrofluorocarbon (or $SF_6$) that is energized so as to selectively etch the hinge layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge layer (e.g. chlorine chemistry for a metal layer, hydrocarbon or fluorocarbon (or $SF_6$) plasma for silicon or silicon compound layers, etc.).

After patterning, the deformable hinge is affixed at its ends along the length to the internal surface of wall of the cavity. To improve adhesion of the deformable hinge to the internal surface, adhesion materials 332a and 332b can be alternatively deposited between the deformable hinge and the internal surface.

Following the fabrication of the deformable hinge, the reflective mirror plate of the micromirror is fabricated, as shown in FIG. 17c. Specifically, the handling substrate, as well as the protection layer 322 in FIG. 17a is removed using a physical technique, such as grinding and polishing, or a chemical technique, such as etching, or a combination thereof. The chemical etching method can be any suitable etching method as long as the mirror substrate will not be damaged, such as energized etching (e.g. plasma, ion etching, wet or dry etching) or non-energized etching (e.g. etching with spontaneous etchants) depending upon the material of the handling substrate.

The bottom of the cavity is then thinned from D to D', with D' being the desired thickness of the reflective mirror plate. D' is preferably 1 micron or less, more preferably from 0.1 to 0.45 micron.

The single crystal having the cavity with the deformable hinge formed therein is then assembled with substrate 334 having addressing electrode 336, as shown in FIG. 17c. Specifically, the walls of the cavity are bonded to substrate 334. The assembly is illustrated in FIG. 17d. In performing the bonding, the two substrates may be required to be aligned together. Such alignment can be performed in the aid of holes made in the substrates. For example, a hole through one or both of the silicon substrates can be made with deep silicon etch (e.g. STS deep silicon etch tool). The two substrates are then optically aligned via the hole.

The surface of the single crystal is then patterned to define the mirror plate, as shown in FIG. 17e. Specifically, mirror plate 340 is separated from the single crystal surface by apertures 342 and 344 according to the desired shape, such as those illustrated in FIGS. 8 to 13. The walls of the cavity are also patterned into desired posts, such as posts 248 and 250 in FIG. 8, or posts 278 and 280 in FIG. 10.

Finally, the micromirror device is released by removing the sacrificial layer using proper etching process with selected etchants. The release etching utilizes an etchant gas capable of spontaneous chemical etching of the sacrificial material, preferably isotropic etching that chemically (and not physically) removes the sacrificial material. Such chemical etching and apparatus for performing such chemical etching are disclosed in U.S. patent application Ser. No. 09/427,841 to Patel et al. filed Oct. 26, 1999, and in U.S. patent application Ser. No. 09/649,569 to Patel at al. filed Aug. 28, 2000, the subject matter of each being incorporated herein by reference. Preferred etchants for the release etch are gas phase fluoride etchants that, except for the optional application of temperature, are not energized. Examples include HF gas, noble gas halides such as xenon difluoride, and interhalogens such as $IF_5$, $BrCl_3$, $BrF_3$, $IF_7$ and $ClF_3$. The release etch may comprise additional gas components such as $N_2$ or an inert gas (Ar, Xe, He, etc.). In this way, the remaining sacrificial material is removed and the micromechanical structure is released. In one aspect of such an embodiment, $XeF_2$ is provided in an etching chamber with diluents (e.g. $N_2$ and He). The concentration of $XeF_2$ is preferably 8 Torr, although the concentration can be varied from 1 Torr to 30 Torr or higher. This non-plasma etch is employed for preferably 900 seconds, although the time can vary from 60 to 5000 seconds, depending on temperature, etchant concentration, pressure, quantity of sacrificial material to be removed, or other factors. The etch rate may be held constant at 18 Å/s/Torr, although the etch rate may vary from 1 Å/s/Torr to 100 Å/s/Torr. Each step of the release process can be performed at room temperature.

In addition to the above etchants and etching methods mentioned for use in either the final release or in an intermediate etching step, there are others that may also be used by themselves or in combination. Some of these include wet etches, such as ACT, KOH, TMAH, HF (liquid); oxygen plasma, $SCCO_2$, or super critical $CO_2$ (the use of super critical $CO_2$ as an etchant is described in U.S. patent application Ser. No. 10/167,272, which is incorporated herein by reference). Of course, the etchants and methods selected should be matched to the sacrificial materials being removed and the desired materials being left behind.

As a way of example, the sacrificial material is removed through multiple etching steps including a breakthrough etching. Specifically, the breakthrough etching removes a portion of the material and fully or partially physically removes the material, and where a subsequent etch step removes additional material and removes the material chemically but not physically as set forth in U.S. patent application Ser. No. 10/154,150 filed May 22, 2002, the subject matter being incorporated herein by reference.

The breakthrough etching is performed having relatively low selectivity (e.g. less than 200:1, preferably less than 100:1 and more preferably less than 35:1 or even 10:1); and with an energized vapor phase etchant selected from the possible etchants as discussed above, such as fluorides. The energized fluoride gas can be energized with, for example, light (e.g. UV light), an electric field, or other fields or energy to energize the gas beyond its normal energy as a gas at a particular temperature, such as into a plasma state. This energizing of the gas of the invention gives it a physical component to its etching behavior, in addition to a chemical component. Specific examples for energizing the etchant of the first etch include using a pair of parallel plate electrodes disposed in a chamber with a gas, and applying electric power of high frequency to the electrodes so that gas discharging takes place to generate gas plasma. Besides reactive ion etching and plasma etching, there are EDR dry etching methods, ion beam etching methods and photo excited etching methods. The etchant in the breakthrough etching could also be a noble gas which is energized so as to cause a purely physical etch in the first etch (e.g. an Ar or Xe sputter etch). These methods preferably accomplish the initial etch by causing an interaction physically (Ar sputter) or chemically and physically (plasma fluoride compound) between the energized gas and the material to be removed in making the device. The breakthrough etching, therefore, is preferably the result of at least energetic bombardment of the sacrificial material (e.g. by charged species such as positive ions, electrons or negative ions), and possibly additionally a chemical reaction between the etchant gas or gases (e.g. by radicals) and the sacrificial material. Following the breakthrough etching other etching steps with relatively high selectivity can be performed. In other embodiments of the invention, the breakthrough etching may not be required and instead is replaced by other etching methods with high selectivity, which will be discussed afterwards.

One or more additional gases can be mixed with the aforementioned etchants for the breakthrough etch, including one or more of $O_2$, an inert gas such as Xe or Ar, $N_2$, $F_2$, $H_2$, CO, $N_xF_y$ (e.g. $NF_3$), $Si_xF_y$ (e.g. $SiF_4$) or an additional fluorocarbon (with or without a hydrogen component) as above. The exact mixture of gases for the first etch can be optimized for the sacrificial material as known in the art, though it is not necessary that the selectivity be optimized (rather that the primary fluoride containing gas and any additional gases be capable of etching silicon and/or silicon compounds when energized). Regardless of which gas or gases are used in the first energized etch, it is preferred that the first etch not proceed all the way through the thickness of the sacrificial layer. In most cases, the first etch should proceed through ¼ or less, or preferably 1/10 or less of the total thickness of the sacrificial layer. Also, it is preferred that the etch proceed for less than 20 minutes, and more preferably less than 10 minutes. The preferred etching depth is 500 angstroms or less and preferably less than 250 angstroms. Such limits on the first etch should result in substantially no undercutting (of etch material from under the micromechanical structural material).

Following the breakthrough etch, or even without the breakthrough etch, a non-energized and non-plasma spontaneous vapor phase etching process is carried out (step 282 in FIG. 17). As a way of example, an etching process with slow etching rate for achieving high selectivity and/or determining an end of the etching reaction can be performed. In one embodiment of the invention, a silicon material is etched at an etch rate of 27.7 um/hr or less, and preferably at an etch rate of 7.2 um/hr or less. The method can also providing a sample to be etched in a chamber; providing a vapor phase etchant to the chamber to etch the sample, the vapor phase etchant capable of etching the sample in a non-energized state. The invention can also include monitoring the gas from the etching chamber; and determining the end point of the etch based on the monitoring of the gas from the etching chamber. Selectivity of the etch can further be improved by doping the silicon material as set forth in U.S. patent application Ser. No. 09/954,864, filed Jun. 17, 2001, the subject matter being incorporated herein by reference.

With the selected gaseous spontaneous etchants, the etching process can be performed under a high pressure, as set forth in U.S. patent application Ser. No. 10/104,109, filed Mar. 22, 2002, the subject matter being incorporated herein by reference. For achieving high selectivity and/or determining an end of the etching reaction, the sacrificial material is removed through chemical etching at a total gas pressure at the etch sight of 10 Torr or more, preferably 20 Torr or more, or even 50, 100 or 200 Torr or more. Other features of the invention, including use of diluents along with the vapor phase etchant, etching slower than 25 or 20 um/hr, recirculating or agitating etching gas during the etch, detecting gas components in order to determine an etch end point, improved selectivity, plasma etching prior to the vapor phase etch, among others, can be included herein.

As another way of example, the sacrificial material can be removed using one or more selected spontaneous vapor phase etchants, while the etchants are fed according to discrete time schedule as set forth in U.S. patent application Ser. No. 10/665,998, filed Sep. 17, 2003, the subject matter being incorporated herein by reference. A spontaneous etchant is a chemical etchant such that a chemical reaction between said etchant and a sacrificial material occurs spontaneously and does not require activation energy. And a spontaneous vapor phase etchant is a spontaneous chemical etchant that reacts with the sacrificial material in vapor phase. In the embodiments of the invention, the supply of the etchant to remove the sacrificial materials can be "infinite"—e.g. much larger than the quantity required to completely remove the sacrificial materials. The etchant is fed into the etch chamber containing the microstructure during each feeding cycle of a sequence of feeding cycles until the sacrificial material of the microstructure is exhausted through the chemical reaction between the etchant and the sacrificial material. Specifically, during a first feeding cycle, a first discrete amount of selected spontaneous vapor phase etchant is fed into the etch chamber. At a second feeding cycle, a second discrete amount of the etchant is fed into the etch chamber. The first discrete amount and the second discrete amount of the selected etchant may or may not be the same. This etchant feeding process continues until the sacrificial material of the microstructure is exhausted through the chemical reaction between the etchant and the sacrificial materials. The time duration of the feeding cycles are individually adjustable.

At each feed cycle, the etchant is fed into the etch chamber via an outer circulation loop that passes through the etch chamber and an exchange chamber in which the etchant is prepared. After the feeding, the etchant is circulated via an inner circulation loop that passes through the etch chamber but not the exchange chamber for etching the sacrificial material. The etchant circulation via the inner circulation loop is stopped and switched into the outer circulation loop upon the arrival of the following etchant feeding during the following feeding cycle. The time interval between any two consecutive etchant feedings is also adjustable.

In order to expedite the chemical reaction between the selected etchant and the sacrificial material inside the etch chamber, the selected spontaneous vapor phase etchant preferably has a pressure from 0.1 to 15 torr. The etchant is mixed with one or more diluent gases with a partial pressure preferably from 20 to 700 torr. Such a gas mixture is particularly useful for removing the sacrificial materials underneath the functional layers of the microstructure.

In an embodiment of the invention, an etching method comprises: loading a microstructure into an etch chamber, wherein the microstructure comprises a sacrificial material and one or more structural materials; providing a first discrete amount of spontaneous vapor phase etchant recipe during a first feeding cycle of a sequence of feeding cycles for removing the sacrificial material; and providing a second discrete amount of the etchant recipe after the first feeding cycle and during a second feeding cycle that follows the first feeding cycle of the sequence of feeding cycles for removing the sacrificial materials.

In another embodiment of the invention, an etching method comprises: (a) establishing a first pressure inside a first chamber, wherein the first pressure is equal to or lower than a pressure in a second chamber that contains a spontaneous vapor phase etchant; (b) filling the first chamber with the etchant; (c) filling the first chamber with a diluent gas such that the pressure inside the first chamber reaches a second pressure that is higher than the first pressure; and (d) circulating the etchant and the diluent gas through the etch chamber.

In another embodiment of the invention, an etching method for etching a sample in an etch chamber comprises: circulating a first amount of spontaneous vapor phase etchant via a first loop that passes through the etch chamber for etching the sample; and circulating a second amount of the etchant via a second loop that passes through the etch chamber and a first chamber other than the etch chamber, wherein the first chamber is not part of the first loop.

As yet another way of example, the sacrificial material can be removed using one or more selected spontaneous vapor phase etchants at a controlled etching rate as set forth in U.S. patent application Ser. No. 10/666,671, filed Sep. 17, 2003, the subject matter being incorporated herein by reference.

For efficiently and uniformly removing sacrificial layers in microstructures using selected gas phase etchant, the etching process is performed with controlled etching rate by feeding the etchant based on a detection of an amount of the etchant or an etch product. In an embodiment of the invention, an etching method comprises: loading a microstructure into an etch chamber of the etch system, wherein the microstructure comprises a sacrificial material and one or more structural materials; providing an amount of a spontaneous vapor phase etchant recipe to the etch system; and providing an additional amount of the etchant recipe to the etch system at a time that is determined based on a measurement of an amount of a chemical species.

In another embodiment of the invention the etchant recipe can be provided to the etch chamber over time, wherein the amount of the etchant recipe per time unit varies. Alternatively, the etchant recipe can be provided to the etch chamber over time, while the amount of the etchant is varied when a change of a measured parameter beyond a predetermined value.

As yet another way of example, the sacrificial material can be removed using one or more selected spontaneous vapor phase etchants having a mean-free-path corresponding to the minimum thickness of the sacrificial layers between the structural layers of the microstructure, as set forth in U.S. patent application Ser. No. 10/666,002, filed Sep. 17, 2003, the subject matter being incorporated herein by reference.

In an embodiment of the invention, the etching process for removing a sacrificial material that is disposed within a gap between two structural layers of a microstructure using a vapor phase etchant recipe is disclosed. The method comprises: determining a size of the gap; preparing the vapor phase etchant recipe such that a mean-free-path of the etchant recipe is equal to or less than the gap size; and removing the sacrificial material of the microstructure using the prepared etchant recipe.

During the etching process, accurate detection of the end of the etching process is certainly desirable for avoiding over-etch and under-etch. A method used for the etching of layers or areas, and in particular, for determining an end of the etching reaction is set forth in U.S. patent application Ser. No. 10/269,149, filed Oct. 12, 2002, the subject matter being incorporated herein by reference.

Because the micromirror plate is designated for reflecting incident light in the spectrum of interest (e.g. visible light spectrum), it is preferred that the mirror plate comprises one or more materials that exhibit high reflectivity (preferably 90% or higher) to the incident light. Examples of such materials are Al, Ti, Ag, $AlSi_xCu_y$, $AlTi_x$ or $AlSi_x$. Of course, other suitable materials having high reflectivity to the incident light of interest may also be adopted for the mirror plate.

Alternative to the fabrication process discussed above wherein the handling substrate is removed before bonding the thinned mirror substrate to the electrode substrate, the handling substrate can be removed after bonding the mirror plate to the electrode substrate. Specifically, the handing substrate can be bonded to the mirror substrate with the protection layer disposed in between. The mirror substrate is then formed therein a cavity. The mirror substrate having the cavity and bonded to the handling substrate is then bonded to the electrode substrate having the addressing electrode formed thereon. After bonding, the handling substrate and the protection layer are removed from the mirror substrate followed by the thinning process of the mirror substrate. The thinned mirror substrate is then patterned so as to form the desired mirror plate and deformable hinge.

FABRICATION EXAMPLE TWO

As another way of example in fabricating a micromirror device as discussed with reference to FIG. 7, cross-sectional views of the micromirror in the exemplary fabrication process is illustrated in FIGS. 18a to 18e, and will be discussed in detail in the following.

Referring to FIG. 18a, substrate 346, which is a single crystal such as single crystal silicon, is provided followed by formation of a cavity therein. Sacrificial material 348, which may or may not be the same as sacrificial layer 326 in FIG. 17b is deposited within the cavity. The single crystal substrate is then attached to handling substrate 352 with an alternative protection layer 350 deposited between the handling substrate and single crystal substrate. The bottom of the cavity is then thinned from the original thickness of H to H', which is the desired thickness of the deformable hinge. For example, H' can be 1 micron or less, such as 0.4 microns or less, or 0.3 micron or less. On the thinned bottom of the cavity, second sacrificial layer 354 is deposited. The second sacrificial layer may or may not be the same as the first sacrificial layer. Because the thickness of the second sacrificial layer determines the vertical distance between the mirror plate and the deformable hinge, it is preferred that the second sacrificial layer has a thickness of 0.5 micron or less, preferably from 0.15 to 0.45 micron. Alternatively, the distance between the mirror plate and the deformable hinge may have a larger value, such as from 0.5 to 1.5 microns, though a thickness of from 500 Å to 50,000 Å, preferably around 0.3 micron, is preferred. The first sacrificial layer may be deposited on the substrate using any suitable method, such as LPCVD or PECVD.

The second sacrificial layer is then patterned so as to form hinge contact 358 using the same method for forming hinge contact 330 in FIG. 17b, which will not be discussed in detail herein. Specifically, the formed hinge contact preferably comprises $SiN_x$ and $TiN_x$ on the side wall.

Following the formation of the hinge contact, mirror plate layer 356 is deposited and patterned on the second sacrificial layer as shown in FIG. 18b. Because the micromirror is designated for reflecting incident light in the spectrum of interest (e.g. visible light spectrum), it is preferred that the micromirror plate layer comprises of one or more materials that exhibit high reflectivity (preferably 90% or higher) to the incident light. The thickness of the micromirror plate can be wide ranging depending upon the desired mechanical (e.g. elastic module), the size of the micromirror, desired ON state angle and OFF state angle, and electronic (e.g. conductivity) properties of the mirror plate and the properties of the materials selected for forming the micromirror plate. In an embodiment of the invention, the mirror plate is a multi-layered structure, which comprises a $SiO_x$ layer with a preferred thickness around 400Å, a light reflecting layer of aluminum with a preferred thickness around 2500 Å, and a titanium layer with a preferred thickness around 80Å. In addition to aluminum, other materials, such as Ti, AlSiCu, Ag, Au and TiAl, having high reflectivity to visible light can also be used for the light reflecting layer. These mirror plate layers can be deposited by PVD at a temperature preferably around 150° C. The deposited mirror plate layer is then patterned into the desired shape, such as the mirror plate illustrated in FIGS. 8 to 13 using for example standard photolithography.

The micromirror having the mirror plate and deformable hinge will be assembled with a semiconductor substrate having an addressing electrode, as shown in FIG. 18c. In aid of such assembling, handling substrate 362 is attached to the fabricated mirror plate. For protection purposes, protection layer 360 may be deposited between the mirror plate and the handling substrate.

Before assembling, the previous handling substrate 352 and the protection layer 350 (if provided) are removed to expose the surfaces of the posts and the first sacrificial material. The micromirror is then bonded to substrate 364 having addressing electrode 366 formed thereon, as shown in FIG. 18c. The assembled micromirror device after bonding is illustrated in FIG. 18d. In performing the bonding, the two substrates may be required to be aligned together. Such alignment can be performed in the aid of holes made in the substrates. For example, a hole through one or both of the silicon substrates can be made with deep silicon etch (e.g. STS deep silicon etch tool). The two substrates are then optically aligned via the hole.

The second handling substrate 362, as well as protection layer 360 (if deposited previously) is removed. Finally, the first and second sacrificial layers are removed to release the mirror plate. The sacrificial materials can be removed using the same etching process for removing sacrificial material 326 in FIG. 17e as discussed earlier.

FABRICATION EXAMPLE THREE

Alternative to the fabrication method as discussed with reference to FIGS. 18a to 18e, another exemplary method for fabricating the micromirror as discussed with reference to FIG. 7 is illustrated in FIGS. 19a through 19f, wherein cross-sectional views of the micromirror during the fabrication are illustrated.

Figure 19A:
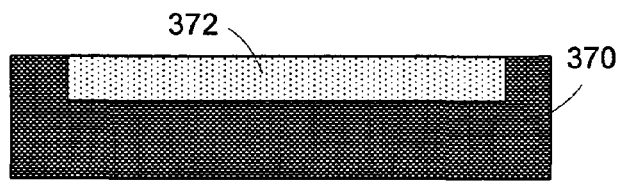
FIG. 19a to FIG. 19f are cross-section views of a micromirror in yet another exemplary fabrication process.
Figure 19B:
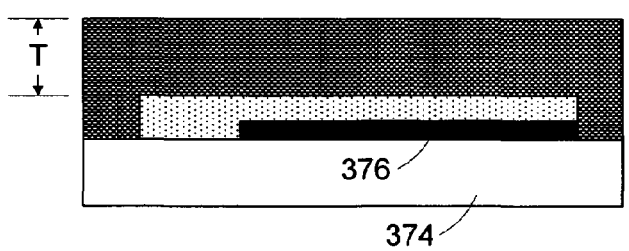
Figure 19C:

Referring to FIG. 19a, the substrate 370 is a single crystal, such as single crystal silicon. A cavity is formed and filled with first sacrificial material 372. The first sacrificial material can be the same as the sacrificial material for sacrificial layer 326 in FIG. 17b. The single crystal is then bonded to substrate 374 having addressing electrode 376 formed thereon, as shown in FIG. 19b. The bottom of the cavity is then thinned from the original thickness of T to T' as the desired thickness of the hinge. For example, the desired thickness T' of the hinge can be 0.5 micron or less, preferably from 0.1 to 0.45 microns, as shown in FIG. 19c. In performing the bonding, the two substrates may be required to be aligned together. Such alignment can be performed in the aid of holes made in the substrates. For example, a hole through one or both of the silicon substrates can be made with deep silicon etch (e.g. STS deep silicon etch tool). The two substrates are then optically aligned via the hole.

The thinned bottom of the cavity is then patterned into desired hinge, such as hinge 246 in FIG. 8 or 272 in FIG. 10. In particular, the hinge support, such as hinge support 270 in FIG. 10 can also be formed at this time, when micromirror 268 in FIG. 10 is expected.

Figure 19D:
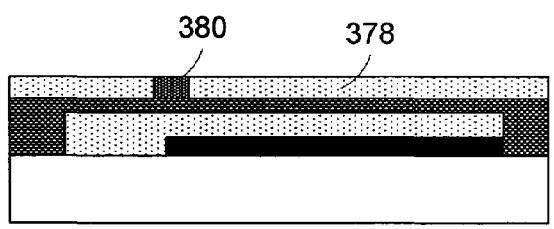
Figure 19E:
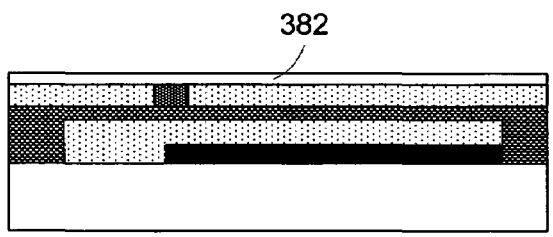

Second sacrificial layer 378 is then deposited on the formed hinge followed by patterning so as to form hinge contact 380. The second sacrificial layer is preferably the same as the first sacrificial layer 372 and deposited in the same way. The material and the method of forming hinge contact 330 in FIG. 17b can be used in forming hinge contact 380 herein, as shown in FIG. 19d.

On the patterned second sacrificial layer and formed hinge contact, mirror plate layer 382 is deposited and patterned so as to form the desired mirror plate, such as the mirror plate illustrated in FIGS. 8 to 13. The material for mirror plate 356 in FIG. 18c, and the method of forming discussed accordingly can also be used to form mirror plate 382 in FIG. 19e.

Figure 19F:
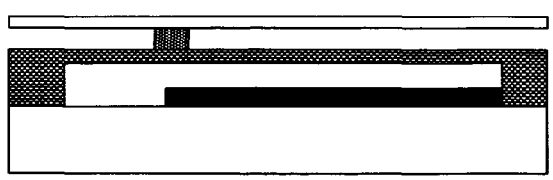

Finally, the first and second sacrificial layers 372 and 378 are removed. The etching method for removing sacrificial material 326 in FIG. 17b as discussed with reference to FIG. 17e can also be used herein to remove sacrificial layers 372 and 378 in FIG. 19e. The released micromirror after removal of the sacrificial layers is illustrated in FIG. 19f.

Alternative to the fabrication process discussed above wherein the handling substrate is removed before bonding the thinned mirror substrate to the electrode substrate, the handling substrate can be removed after bonding the mirror plate to the electrode substrate.

FABRICATION EXAMPLE FOUR

The micromirror device of the present invention may have deformable hinge and reflective mirror plate both formed from single crystals. An exemplary fabrication method will be discussed with reference to FIGS. 20a through 20f in the following.

Figure 20A:
FIG. 20a to FIG. 20f are cross-section views of a micromirror in yet another exemplary fabrication process.
Figure 20B:
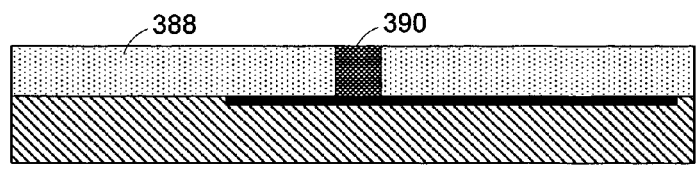

Referring to FIG. 20a, semiconductor substrate 384 having addressing electrode 386 is provided. Sacrificial layer 388 is deposited on the semiconductor substrate followed by patterning so as to form posts 390 (e.g. posts 248 and 250 in FIG. 8). The posts may be composed of the same material as hinge contact 330 in FIG. 17b, and can also be fabricated using the same method for fabricating hinge contact 330.

Figure 20C:
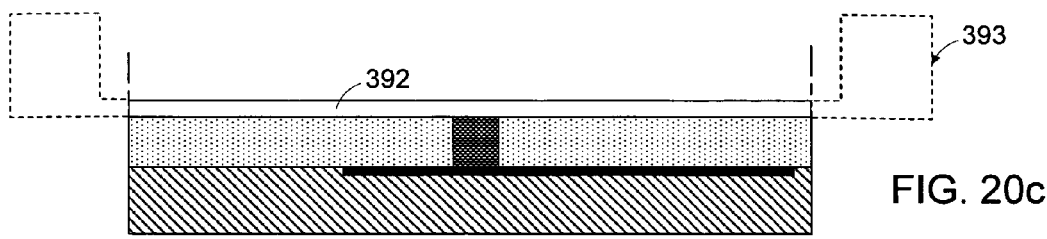
Figure 20D:
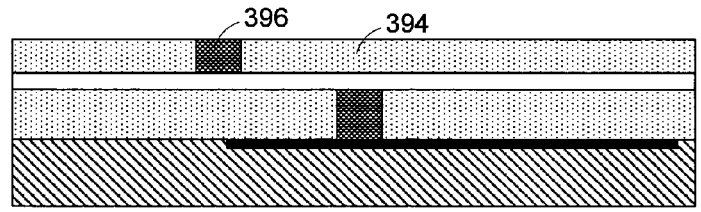

Then hinge 392 which is formed from a single crystal (e.g. single crystal silicon) is attached to, for example through bonding, the hinge contact. As a way of example, the hinge may be developed from a cavity in a single crystal, as discussed with reference to FIGS. 18a and 18b. The cavity can be made such that the bottom of the cavity has a larger area than the largest dimension of the desired hinge. The bottom of the cavity is thinned to the desired thickness, such as 0.1 to 0.45 micron. The single crystal having the cavity with the thinned bottom is then attached to the surface of the first sacrificial layer. In this process, a handling substrate can be used. The bottom of the single crystal is then cut to remove the walls of the cavity and leave over the flat bottom of the cavity, as shown in FIG. 20c. This cutting step can alternatively be performed afterwards, for example, before or even after releasing the micromirror by etching.

On the single crystal hinge, second sacrificial layer 394 is deposited followed by patterning so as to form hinge contact 396. The second sacrificial layer is preferably the same as the first sacrificial layer, but not required. The hinge contact can be formed in the same method as hinge contact 358 in FIG. 18b.

Figure 20E:
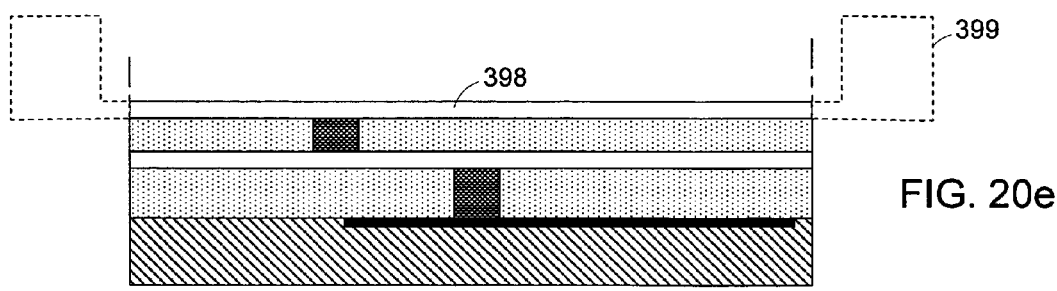
Figure 20F:
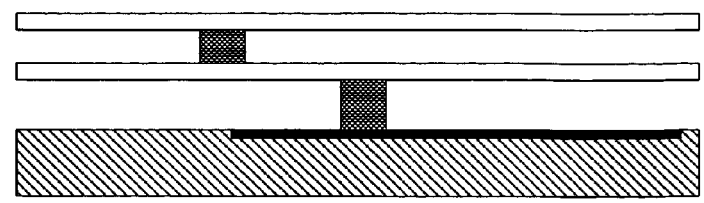

Then mirror plate 398 is attached to, such as through bonding, the hinge, as shown in FIG. 20e. The mirror plate is derived from a single crystal, such as single crystal silicon. As a way of example, the mirror plate may be developed from cavity 399 in a single crystal as discussed with reference to FIGS. 17a and 17b. The cavity can be made such that the bottom of the cavity has a larger area than the largest dimension of the desired mirror plate. The bottom of the cavity is thinned to the desired thickness, such as 0.1 to 0.45 micron. The single crystal having the cavity with the thinned bottom is then attached to the surface of the second sacrificial layer. In this process, a handling substrate can be used. The bottom of the single crystal is then cut to remove the walls of the cavity and leave over the flat bottom of the cavity, as shown in FIG. 20c. This cutting step can alternatively be performed afterwards, for example, before or even after releasing the micromirror by etching.

Finally, the deposited first and second sacrificial layers are removed through etching, such as the etching method for removing the sacrificial layers as discussed with reference to FIG. 17e. In the so fabricated micromirror device, both of the mirror plate and deformable hinge are formed from single crystals.

EXEMPLARY FABRICATION FIVE

The micromirror device having mirror plate and hinge that both are single crystals can be fabricated in other methods, one of which is illustrated in FIGS. 21a to 21d.

Figure 21A:
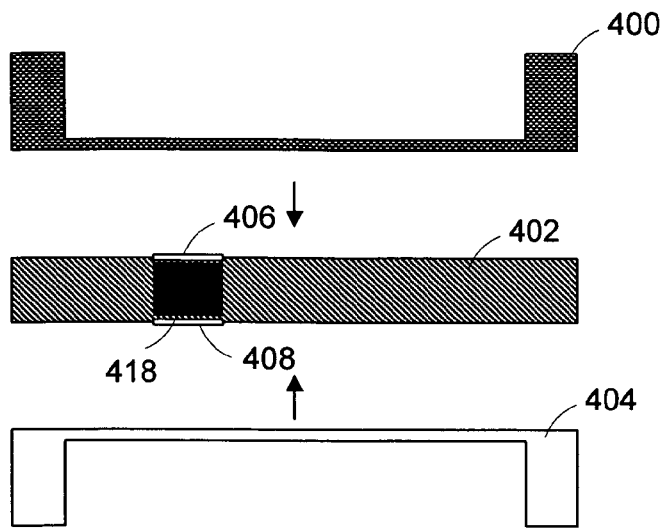
FIGS. 21a to 21d are cross-section views of a micromirror in yet another exemplary fabrication process.

Referring to FIG. 21a, single crystal substrates 400 and 404 each having a cavity are provided and bonded to the opposite sides of hinge contact 418 made within sacrificial substrate 402. In performing the bonding, the two substrates may be required to be aligned together. Such alignment can be performed in the aid of holes made in the substrates. For example, a hole through one or both of the silicon substrates can be made with deep silicon etch (e.g. STS deep silicon etch tool). The two substrates are then optically aligned via the hole. For securing the bonding, adhesive pads 406 and 408 can be alternatively provided between the single crystal substrates and the surfaces of the hinge contact. The sacrificial substrate can be composed of the same material as the sacrificial layer 326 in FIG. 17b. The hinge contact may have the same material of and fabricated in the same way as hinge contact 330 in FIG. 17b.

Figure 21B:
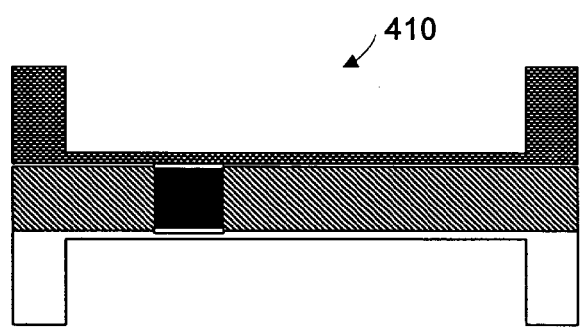

The boned substrates with the sacrificial substrate are illustrated in FIG. 21b. Then the bottom of the cavity in the mirror plate substrate (e.g. substrate 404) is patterned so as to from the desired mirror plate, such as the mirror plate in FIGS. 8 to 13. The bottom of the cavity in the hinge substrate 400 is patterned so as to form the desired hinge, such as the hinge in FIGS. 8 to 13.

Figure 21C:
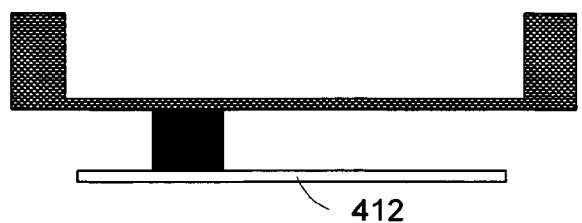
Figure 21D:
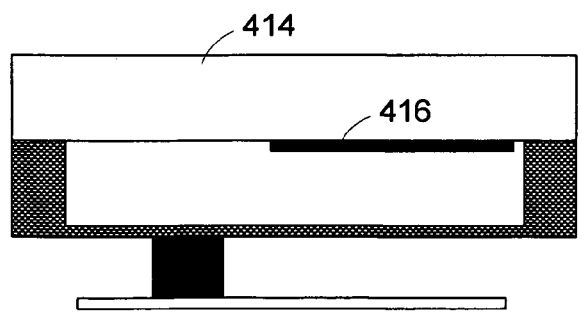

Then the sacrificial substrate 402 between the single crystal mirror plate and hinge substrates are removed, leaving over the hinge contact that connects the formed mirror plate to the formed hinge, as shown in FIG. 21c. Finally, the fabricated micromirror is assembled to semiconductor substrate 414 having addressing electrode 416 formed thereon, which is shown in FIG. 21d.

In a micromirror array device, such as a spatial light modulator, having an array of micromirrors of the present invention as discussed above, other alternative features can be provided. For example, not all micromirrors in the micromirror array (e.g. micromirror array in FIGS. 4 to 7 and 14 to 16) are provided two posts. Instead, one or more micromirrors in the array may have less than two, such as one or even no post. According to the embodiment of the invention, posts are provided for selected micromirrors in a micromirror array. In this instance, each micromirror preferably has a rigid and stiff hinge support, such as hinge support 270 in FIG. 10, and the hinge supports of a portion or all of the micromirrors in the array are interconnected, forming one or more hinge support strips or hinge support frames or a combination thereof across the entire micromirror array. Posts are provided between the hinge support strips (and/or hinge support frame) and the substrate for supporting the hinge support strips (and/or frame). Specifically, the posts are connected to the hinge supports and the substrate. However, a hinge support may not have a post connected thereto, or a hinge may not have two posts connected thereto. In this situation, the hinge support without or with less than two posts is supported and held by the hinge support strips (and/or the hinge support frame) to which the hinge support is connected, as set forth in U.S. patent application attorney docket number P136-US to Huibers, filed on the same day as the current patent application, the subject matter being incorporated herein by reference.

The posts can be provided for selected micromirrors in a micromirror array. The selection can be made according to a predetermined criterion. For example, the micromirrors to be provided with posts can be randomly selected from the micromirrors. Alternatively, every a particular number of micromirrors can be selected to be provided with one or more posts. In another embodiment of the invention, the selection of the micromirror having posts can be made depending upon the mechanical properties of the hinges, the hinge supports, and the mirror plates.

In operation, a beam of illumination light is incident onto the mirror plates of the micromirrors in the micromirror array and reflected by the individual mirror plates so as to form the desired image. The quality of the produced image is degraded in the presence of undesired scattered light. The scattered light may arise from the areas exposed to the illumination light except the reflecting surfaces of the mirror plates, such as the exposed areas in the posts and the semiconductor substrate having the addressing electrode. To remove such undesired light scattering, a light absorbing coating may be deposited. For example, a light absorbing film can be deposited around the parameter of the micromirror array so as to absorb undesired scattered light from the components other than the reflective mirror plates of the micromirrors. A light absorbing film may also be formed within the micromirror array, such as around the individual micromirrors or around a group of micromirrors.

Alternatively, a light absorbing film can be formed on the semiconductor substrate having thereon the addressing electrode and circuitry array. Such light absorbing film may or may not be provided in the same way as the light absorbing film on the substrate having the micromirrors as discussed above. The light absorbing films can be presented in many forms such as a continuous film, strips, or frames, or any combinations thereof.

When the micromirror has one single addressing electrode for addressing and deflecting the associated mirror plate, the mirror plate is expected to return to its OFF state under the restoration force, such as the restoration force derived from the deformation accumulated in the deformed hinge. However, the mirror plate may not be able to return to the OFF state under such restoration force due to the fact that an additional surface force may be in presence, which overcomes the restoration force. In this situation, in-use stiction occurs in the contact area of the mirror plate and stopping mechanism (e.g. a substrate, an electrode, or a stopper) of the micromirror device. In order to prevent such in-use stiction, the micromirror device, especially the contact area, can be lubricated with a lubricant material that coats or physically reacts with the surface molecules of the contact area, as set forth in U.S. patent application Ser. No. 10/810,076, filed Mar. 26, 2003, and U.S. patent application Ser. No. 10/890,352, filed Jul. 12, 2004, the subject matter of each being incorporated herein by reference.

The lubricant is preferably a material that does not form covalent bands with the target surface. It can be in a liquid state at the device operation temperature, such as 70° C. degrees or less, or 50° C. or less. The surface tension of the lubricant on the surface is desired to be low, such as 50 dynes/cm or less, or 20 dynes/cm or less. The lubricant may have a high boiling point (e.g. 150° C. or higher, or 200° C. or higher) or low vapor pressure such that the lubricant does not condense at low temperature or fully evaporate at high temperatures (e.g. 50° C. or more, or 70° C. or more, or even 200° C. or more) (the high temperature refer to the storage and operating range of the micromirror device). The lubricant is desired to be stable at a high temperature, such as up to 200° C. The viscosity of the lubricant in liquid phase can be of from 1 cP to 100 cP. Moreover, it is desired that the selected lubricant is able to form a physisorbed layer with a thickness of around 3 nm or less at a low partial pressure.

The lubricant can be a mono-ether or thio-ether (which can be unfluorinated, partially fluorinated, or perfluorinated), an amine, a phosphine, a borane material, a fluorinated organic material containing a ring structure (e.g. triazines), or a tetralkylsilane having four substituent groups, $R_1R_2R_3R_4Si$, wherein $R_1$ to $R_4$ are bonded to Si and are independently alkyl groups each preferably having 1 to 6 carbons. It is preferred that one of $R_1$ to $R_4$ groups is partially or fully fluorinated. The alkyl groups, $R_1$ to $R_4$ may or may not be that same, but preferably not labile, e.g. not reactive (e.g. do not hydrolyze). Examples include tetraperfluoroalkylsilanes such as perfluorinated tetramethylsilanes. For example, the lubricant can be a straight-chain fluorocarbon represented by $F_3C-(CF_2)_n-CF_3$, wherein n can be 4, 5 (e.g. FC-84, a product from Aka), 6 (e.g. a product from Exfluor), 7 (e.g. a product from Exfluor), and 8 (e.g. a product from Exfluor). As another example, the lubricant can be a perfluoroamine $CF_3$ $(CF_{2n})_3$ N, wherein n can be 3 (i.e. perfluorotributylamine, e.g. FC-43, a product from Aka), 4(e.g. FC-70, a product from Aka), and 5 (i.e. perfluorotrihexylamine, e.g. FC-71, a product from 3M). As yet another example, the lubricant can be a perfluorocarbon with a ring structures, such as perfluorodecalin $C_{10}F_{18}$ (e.g. a product from Aldrich), perfluoromethyldecalin $C_{11}F_{20}$ (e.g. a product from Alfa Aesar), perfluoroperhydrophenil $C_{12}F_{22}$ (e.g. a product from Interchim), perfluoroperhydrofluorene $C_{13}F_{22}$ (e.g. a product from Interchim), perfluorotetradecahydrophenanthrene $C_{14}F_{24}$ (e.g. FC-5311, a product from Aka), or perfluorophenanthrene $C_{14}F_{24}$ (e.g. a product from SciInstrSvcs). As yet another example, the lubricant can be ring-structure perfluorocarbon with one or more oxygen linkage between rings, such as $C_{12}F_{24}O$, and single cycloether, as illustrated in FIG. 4. Alternatively, the lubricant may have fluorocarbon chains attached to a triazine ring, such as $C_{12}F_{21}N_3$, $C_{24}F_{45}N_3$ and $C_{30}F_{57}N_3$. The lubricant can also be a perfluorinated hydrocarbon having 20 carbons or less, such as alkanes, amines, alcohols, ethers, triazines and glycols.

The lubricant may be mixed with a diluent to form a lubricant solution. The lubricant is desired to be in a liquid phase at room temperature. For example the boiling point of the lubricant can be 30° C. or higher and/or the melting point is 110° C. or lower. The diluent may have a high vapor pressure at room temperature relative to the lubricant such that it does not condense on the target surface. Moreover, it is desired that the diluent is chemically stable at a temperature of 200° C. or higher. An exemplary diluent is a perfluorinated hydrocarbon having 20 carbons or less.

The selected lubricant can be applied to the desired surfaces in many ways. For example, the lubricant can be held by a container that is disposed within the micromirror array device package. The lubricant evaporates from an opening of the container and contacts the desired surfaces to be lubricated. Alternatively, the selected lubricant can be disposed on a substrate of the microstructure package, as set forth in U.S. patent application Ser. No. 10/810,079, filed Mar. 26, 2004, and U.S. patent application Ser. No. 10/811,449, filed Mar. 26, 2004, the subject matter of each being incorporated herein by reference.

The container containing the lubricant can be a capillary tubing, a capillary cylinder. By precisely defining the dimension of the capillary tubing (or the cylinder), the amount of lubricant for lubricating the contacting surfaces can be precisely controlled. For example, the capillary tubing may have an interior diameter of from 2 to 500 micrometers, or from 100 to 200 micrometers. And the interior volume of the capillary tubing can be from 10 pl to 10 µl, or from 30 µl to 2 µl.

Other methods of applying lubricants are also applicable. For example, the lubricants can be deposited within the micromirror array device assembly, particularly on the substrate on which the micromirrors are formed, as set forth in U.S. patent application Ser. No. 10/810,076, filed Mar. 26, 2004, the subject matter being incorporated herein by reference.

In addition to the application of suitable lubricants, the in-use stiction can be further depressed by application of a surface treating material, such as a self-assembly-monolayer. Specifically, surfaces of the structure members in the micromirror, especially the contacting surfaces of the mirror plates and stopping mechanisms of the micromirrors are preferably treated by cleaning, coating with a self-assembled-monolayer (SAM) so as to eliminate stiction, as set forth in U.S. patent application Ser. No. 10/713,671, filed Nov. 13, 2003, U.S. patent application Ser. No. 10/811,449, filed Mar. 26, 2004, the subject matter being incorporated herein by reference.

The contacting surfaces can be cleaned in many ways. An exemplary surface cleaning process may comprise steps of: loading the device into a chamber; preparing a cleaning agent comprising ozone gas and a co-agent that comprises oxygen-containing molecules; and introducing the prepared cleaning agent into the chamber, for cleaning the surface of the microelectromechanical device in the chamber. The oxygen-containing co-agent can be water vapor, hydrogen peroxide vapor, acetic acid vapor, or other suitable chemical agents. The cleaning process is preferably performed at a temperature between 40° C. and 400° C., or between 100° C. and 200° C., and under a pressure between 1 Torr and 5000 Torr.

After surface cleaning, a coating agent can be prepared and introduced to the contacting surfaces of the micromirror array device. The coating agent is preferably a chemical agent such that after introducing the agent onto the contacting surfaces of the micromirror array device, the agent forms a coating layer that is chemically bonded to the contacting surface. Alternatively, the coating agent can be a chemical agent such that after introducing the agent onto the contacting surfaces, the agent forms a coating layer that is physically adsorbed on the contacting surfaces. Moreover, the coating agent can be an agent that comprises a first and second coating components such that after introducing the coating agent onto the contacting surfaces, the first component of the coating agent forms a coating layer that is chemically bonded to the contacting surfaces, and the second component of the coating agent forms another layer that is not chemically bonded to the contacting surfaces.

The cleaning agent, as well as the coating agent can be introduced onto the contacting surfaces in many ways. For example, the micromirror array device can be loaded into a coating chamber, then a first component of the cleaning agent can be introduced into the chamber such that the pressure inside the chamber is at a first pressure value; and then a second component of the cleaning agent can be introduced into the chamber such that the pressure inside the chamber is at a second pressure value that is higher than the first pressure value. For example, the first pressure is from 1 Torr to 700 Torr, and the second pressure can be from 10 Torr to 5000 Torr.

The coating agent may comprise an organosilane, an organochlorosilane, a halogen-substituted organochlorosilane, or a perfluoropolyether. The coating agent can also be selected from a group comprising: a carboxylic acid material having the formula $CF_3(CF_2)_a(CH_2)_bCOOH$, wherein a is greater than or equal to 0, and b is greater than or equal to 0; a fluorocarbon material having the formula $C_nH_mF_{(2n+2-m)})_2$ wherein n is greater than or equal to 1, and m is greater than or equal to 0 and less than (2n+2); a fluorocarbon amine material having the formula $N(C_nH_mF_{(2n+1-m)})_3$ wherein n is greater than or equal to 1 and m is greater. than or equal to 0 and less than (2n+1); a fluorocarbon ether material having the formula $O(C_nH_mF_{(2n+1-m)})_2$ wherein n is greater than or equal to 1 and m is greater than or equal to 0 and less than (2n+1).

The coating with a SAM material is preferably performed at a temperature from 60° C. to 300° C., or from 100° C. to 200° C. with the pressure from 1 Torr to 760 Torr.

As another example, the contacting surfaces can be modified through a process comprising steps of: loading the assembly into a chamber; preparing a gaseous modification agent; and introducing the gaseous modification agent into the chamber such that the cleaning agent is delivered through a micro-opening of the assembly to the surface of the microelectromechanical device for modifying the surfaces of the microelectromechanical device, wherein the micro-opening has a characteristic dimension around 10 micrometers or less.

Other than the lubricants and SAM material, a getter material can also be applied to avoid contamination of the micromirror array device, as set forth in U.S. patent application Ser. No. 10/810,076, filed Mar. 26, 2004, and U.S. patent application Ser. No. 10/869,539, filed Jun. 15, 2004, the subject matter of each being incorporated herein by reference.

The micromirrors and micromirror array devices are generally sensitive to contamination, such as moisture and dust. This contamination has varying effects on the micromirrors, from capillary-condensation and post-release stiction to deterioration of the micromirror surfaces. Such effects can cause mechanical failure of the micromirrors in operation. For this and other reasons, micromirror array devices are often packaged after releasing. Regardless of differences of the packaging methods currently developed for a micromirror array device, two substrates, one for supporting the device and another one for covering the device, and sealing medium(s) for bonding the two substrates are utilized. Most of the sealing mediums require application of heat during bonding. However, the heat, if not properly applied, may degrade the micromirror array device. For example, improperly applied heat may change the desired mechanical properties of the micromirrors. It may also thermally activate particles, such as impurities and particles making up the micromirrors, prompting diffusion of these activated particles within the micromirrors, thus exacerbating degradation of the micromirrors. Or heat may decrease anti-stiction materials within the package.

In order to package the micromirror device, a first and second substrate can be provided. The micromirror array device is accommodated within a cavity formed by the first and second substrate. During packaging, one or more sealing mediums that are applied between the first and second substrate are soldered by at least a heater that is formed along the periphery of the surface of either the first or the second substrate and embedded underneath said surface of said substrate. The first and the second substrates are then bonded through the soldered sealing mediums as set forth in U.S. patent application Ser. No. 10/443,318, filed May 22, 2003, the subject matter being incorporated herein by reference, which will not be discussed in detail herein.

In above examples, the fabrication of the micromirror array is discussed in terms of individual micromirrors. Alternatively, the micromirror can be fabricated on the wafer-lever, which will be discussed in the following with reference to FIGS. 22a and 22b.

Figure 22A:
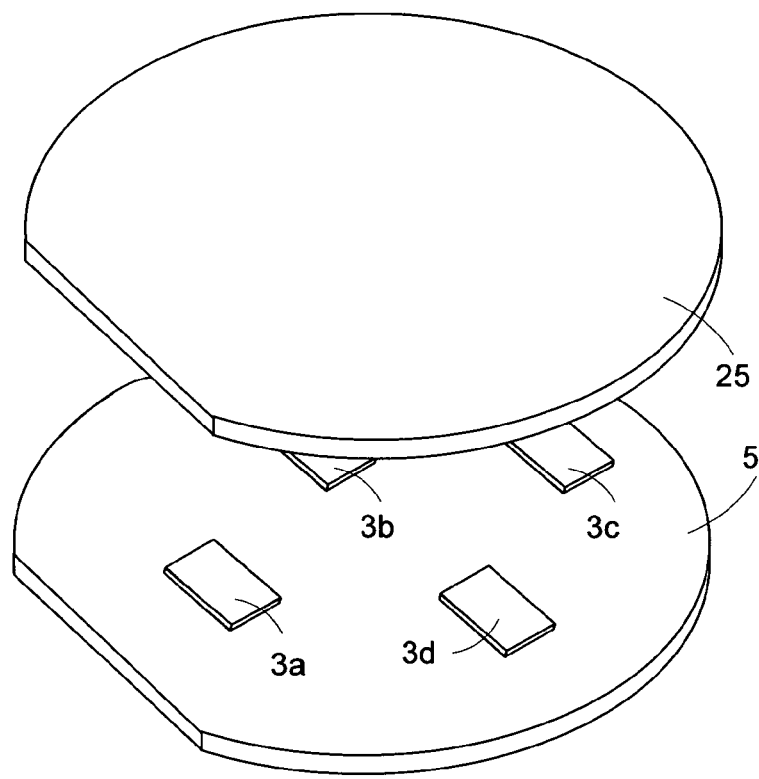
FIGS. 22a to 22b illustrate a wafer-level assembling method in fabrications of the micromirror array device in the invention.

In FIG. 22a, addressing electrode array wafer 25 and micromirror array wafer 5 are brought into contact with each other. The final gap between the two wafers can be any size that allows the two wafers to be held together and singulated uniformly. Because gasket beads will expand upon application of pressure (thus taking up valuable real estate on a wafer with densely positioned die areas), it is preferable that the gap size be larger than 1 um, and preferably greater than 10 um. The gap size can be regulated by providing spacer mixed in with the epoxy (e.g. 25 um spacers). However, spacers may not be necessary depending upon the type of microstructure and the amount of pressure applied.

Figure 22B:
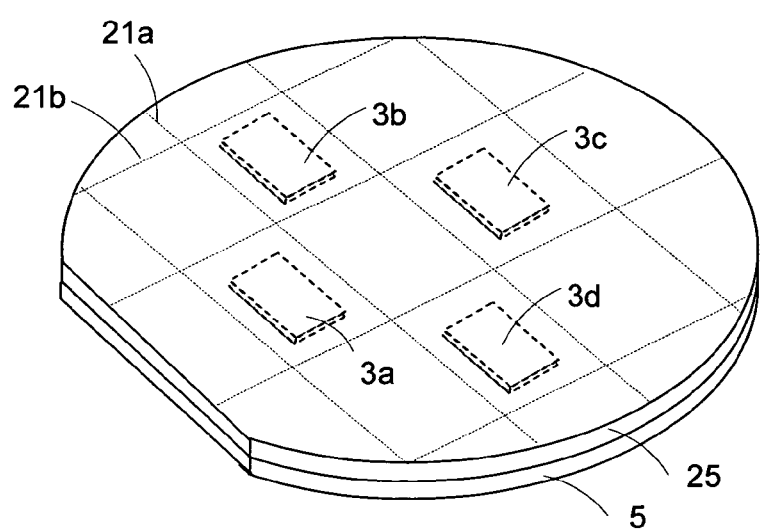

FIG. 22b shows the micromirror wafer 5 and addressing electrode wafer 25 bonded together. Horizontal and vertical score or partial saw lines 21a and 21b are provided on both electrode array wafer 25 and micromirror array wafer 5 (lines not shown on wafer 5). Preferably the score lines on the two wafers are offset slightly from each other at least in one of the (horizontal or vertical). This offset scoring or partial sawing allows for ledges on each die when the wafer is completely singulated into individual dies.

There are many alternatives to the method of the present invention. In order to bond the two wafers, epoxy can be applied to the one or both of the upper and lower wafers. In a preferred embodiment, epoxy is applied to both the circumference of the wafer and completely or substantially surrounding each die/array on the wafer. Spacers can be mixed in the epoxy so as to cause a predetermined amount of separation between the wafers after bonding. Such spacers hold together the upper and lower wafers in spaced-apart relation to each other. The spacers act to hold the upper and lower wafers together and at the same time create a space in which the movable mirror elements can move. Alternatively, the spacer layer could comprise walls or protrusions that are micro-fabricated. Or, one or more wafers could be bonded between the upper and lower wafers and have portions removed (e.g. by etching) in areas corresponding to each mirror array (thereby providing space for deflection of the movable elements in the array). The portions removed in such intermediate wafers could be removed prior to alignment and bonding between the upper and lower wafers, or, the wafer(s) could be etched once bonded to either the upper or lower wafer. If the spacers are micro-fabricated spacers, they can be formed on the lower wafer, followed by the dispensing of an epoxy, polymer, or other adhesive (e.g. a multi-part epoxy, or a heat or UV-cured adhesive) adjacent to the micro-fabricated spacers. The adhesive and spacers need not be co-located, but could be deposited in different areas on the lower substrate wafer. Alternative to glue, a compression bond material could be used that would allow for adhesion of the upper and lower wafers. Spacers micro-fabricated on the lower wafer (or the upper wafer) and could be made of polyimide, SU-8 photoresist.

Instead of microfabrication, the spacers could be balls or rods of a predetermined size that are within the adhesive when the adhesive is placed on the lower wafer. Spacers provided within the adhesive can be made of glass or plastic, or even metal so long as the spacers do not interfere with the electrostatic actuation of the movable element in the upper wafer. Regardless of the type of spacer and method for making and adhering the spacers to the wafers, the spacers are preferably from 1 to 250 microns, the size in large part depending upon the size of the movable mirror elements and the desired angle of deflection. Whether the mirror arrays are for a projection display device or for optical switching, the spacer size in the direction orthogonal to the plane of the upper and lower wafers is more preferably from 1 to 100 microns, with some applications benefiting from a size in the range of from 1 to 20 microns, or even less than 10 microns.

Improvements in Hinge

As discussed in the above examples, the deformable hinge of a micromirror device according to the invention can be single crystal or thin film. When the deformable hinge is derived from a single crystal, such single crystal can be doped with selected materials, such as rare-earth elements, transition metals (including early and late transition metals) or any other suitable materials. Alternatively, the deformable hinge may be doped with a material having high electrical conductivity.

The micromirror array device may suffer from device failure when the deformable hinges experience plastic deformation that exceeds tolerable amounts. To solve this problem, the deformable hinge can be pre-processed for reducing plastic deformation by oxidizing the deformable hinge. For example, the hinge can be thermally processed to form a $SiN_x$, $SiO_x$, $SiN_x$, $SiO_xN_y$, or any combination thereof on the surfaces of the deformable hinge.

The processing method can be performed at different stages of the fabrication and packaging process. Specifically, the method can be performed before or after patterning of the deformable element during the fabrication. The method can also be performed when a portion of the sacrificial layers is removed or after the sacrificial layers are fully removed. The method can also be implemented after the micromirrors have been released and before packaging the released micromirrors. Moreover, the method can be performed during the packaging stage but before the package is hermetically sealed, as set forth in U.S. patent application Ser. No. 10/766,776, filed Jan. 27, 2004, the subject matter being incorporated herein by reference.

As an example, the deformable hinge can be processed by: deflecting the deformable hinge to a deflected state; and oxidizing the deformable hinge in an oxygen-containing gas other than air while the deformable hinge is in the deflected state.

As another example, the deformable hinge can be processed by: oxidizing a material of the deformable hinge equivalent to at least 20 percent in thickness or volume of the deformable hinge by exposing the deformable hinge in an oxygen-containing gas other than air so as to reduce the droop.

As another example, the deformable hinge can be processed during a fabrication process but before the micromirror array device is fully released. Specifically, a portion of the sacrificial material is removed using a vapor phase etchant such that at least a portion of the hinge is exposed. The exposed hinge is then exposed in an oxygen-containing gas other than air followed by removal of the remaining sacrificial material.

Pre-Straining

In addition to the device failure when the thin film deformable hinge experience plastic deformation that exceeds tolerable amounts, device failure may also arise when the deformable hinges deform plastically. For example, the operation states (e.g. the "natural resting state) of the micromirror array device change due to plastic deformation which in turn cause differences between the states to vary over time. The change of the states and variation of the relative distances may affect the performance of the micromirror array devices, especially those devices whose operations depend upon the differences between the states (e.g. the ON and OFF state of the micromirrors). When the plastic deformation exceeds a certain amount, the states or the difference between the states exceeds the tolerable amount—causing device failure. This problem can be solved by pre-straining the deformable hinges (step 296 in FIG. 17), as set forth in U.S. patent application Ser. No. 10/823,823, filed Apr. 13, 2004, the subject matter being incorporated herein by reference. The processing method can be performed at different stages of the fabrication and packaging process. Specifically, the method can be performed before or after patterning of the deformable element during the fabrication. The method can also be performed when a portion of the sacrificial layers is removed or after the sacrificial layers are fully removed. The method can also be implemented after the micromirrors having been released and before packaging the released micromirrors. Moreover, the method can be performed during the packaging stage but before the package is hermetically sealed.

As a way of example, the deformable hinge can be processed by: deforming the hinge to the deformed state; holding the deformable element at the deformed state for a particular time period so as to acquire an amount of plastic deformation for the non-deformed state; and defining a new non-deformed state based on the original non-deformed state and the acquired plastic deformation.

As a way of example, the deformable hinge can be processed by: acquiring an amount of plastic deformation for the non-deformed state; defining a new non-deformed state according to the original non-deformed state and the acquired plastic deformation; and operating the micromirror at the new non-deformed state and the deformed state.

As a way of example, the deformable hinge can be processed by: determining a range of the difference between the states such that the micromirror operates properly when the difference of the states varies within the range; and limiting the variation of the states such that the difference between the states is within the determined range, further comprising: adjusting the non-deformed state through acquisition of an amount of plastic deformation for the non-deformed state such that the distance between the adjusted non-deformed state and the deformed state is within determined range.

Improvements in Mirror Plates

The mirror plates of the micromirror devices are designated for reflecting the illumination light incident thereto so as to produce desired images. To improve the reflectivity of the mirror plate, the reflecting surface of the mirror plate is often coated with a material has high reflectivity to the incident light, such as aluminum as discussed earlier. On the other hand, the mirror plate often comprises silicon (e.g. the silicon single crystal) or a material having silicon. In this situation, diffusion of aluminum and silicon may occur, resulting quality degradation of the mirror plate. For this purposes, the an aluminum-silicon target may be used to sputter the aluminum coating film on the mirror plate. Alternatively, a barrier layer, such as a layer comprising $TiN_x$, $SiO_x$, $SiN_x$, or any combination thereof can be formed between the aluminum and the surface of the mirror plate.

When the mirror plate is desired to be substantially flat, for example to avoid unexpected deformation due to heating or other resources (such as the unbalanced stress from the coated aluminum layer on the reflecting surface) during operation or even fabrication, the top and/or bottom surfaces of the mirror plate can be coated with additional layers. For example, when the aluminum layer on the reflecting surface of the mirror plate causes deformation, the backside (the surface opposite to the reflecting surface) of the mirror plate can be coated with an additional aluminum layer having sufficient thickness so as to balance the distortion resulted from the aluminum layer on the reflecting surface.

In fact, a small curvature of the mirror plate with the circumference bending towards the addressing electrode and the center extending away from the addressing electrode can be advantageous for increasing the contrast ratio. For example, the curvature can be less than 2.5 $mm^{-1}$, and more preferably less than 1 $mm^{-1}$.

The curvature can be achieved by depositing two layers on the opposite major surfaces, such as the reflecting surface and the surface opposite to the reflecting surface) of the mirror plate, wherein the first layer on the reflecting surface exhibits an outwards compression strain at its deposition state; and the second layer exhibits an inwards tensile strain. As a way of example, the first layer is $TiN_x$ with a preferred thickness of 80Å. The second layer can be $SiN_x$ with a preferred thickness of 400Å. PVD (physical vapor deposition or sputtering) tends to produce compressive films, especially for high melting temperature metals, whereas CVD (chemical vapor deposition) tends to produce tensile films.

Light Scattering Control

Because the mirror plate comprises gaps made for defining the deformable hinge in the mirror plate, the gaps is exposed to the illumination light. In operation, the illumination light can travel through the gaps and illuminates the components of the micromirror, such as the surface of the electrode substrate, the electrode, the internal surface of the frame wall, and the top surface of the frame wall, causing unexpected light scattering. This problem can be solved by providing a light absorbing/blocking material to the micromirror, as illustrated in FIG. 23.

Figure 23:
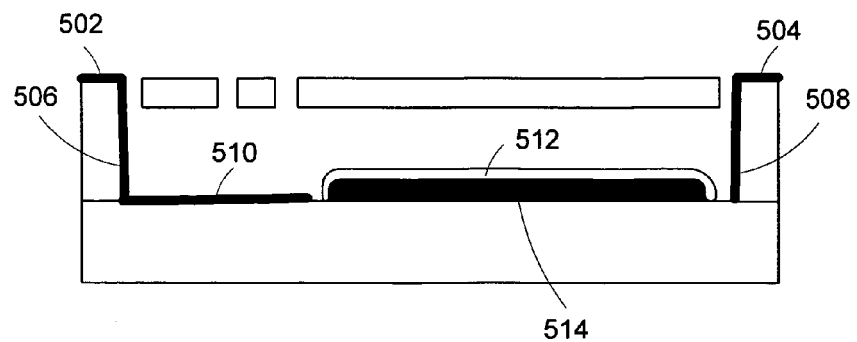
FIG. 23 is an exemplary micromirror device comprises light absorbing/blocking materials.

Referring to FIG. 23, light blocking/absorbing layer 502 can be deposited on the top surface of the frame wall that is exposed to the illumination light. Light absorbing layers 506 and 508 can be deposited on the internal surface of the frame wall so as to absorb illumination light incident thereon. Alternatively, light absorbing layer 510 can be deposited on the areas of the electrode substrate surface not covered by the addressing electrode (addressing electrode 514). For the purpose of preventing or reducing the light scattering from the addressing electrode, the addressing electrode can be coated with light absorbing layer 512.

The light absorbing/blocking layers may comprise any suitable materials. In an embodiment of the invention, the light blocking/absorbing layers are operable to block (or absorb) many wavelengths in the visible spectrum, and are thermal stable. It is preferred that the light blocking (or absorbing) material is capable of blocking (or absorbing) 83% or more, such as 90% or more, 95% or more, and 99% or more of the light incident thereto. For example, the light blocking layer (e.g. layer 502 in FIG. 23) can be ion beam sputtered black chrome or niobium that has a reflectance as low as 3% through the light transmissive substrate. The black chrome coating can be a multilayer structure of chrome and chromium oxide (to match the index of refraction, as in an antireflective coating multilayer film). Of course, other opaque films (preferably those with high optical density, thermally stable and with low reflectivity) can be deposited and patterned (the opacity and color of many films being variable due to deposition parameters).

The light absorbing materials can be black nickel, CrN, TiAlN, TaN, and many films comprising carbon, such as amorphous CN, amorphous CAlN, TiC, TiCN, a-DLC, vitreous carbon, SiC, TiAlCN, WC, etc. Multilayer structures, such as TiC/WC, WC/C or TiAlN/WC/C, can also be used, as well as other multilayer structures with matched indices. Also polyimides and other polymers containing carbon black (or other opacity increasing material) can be used.

When a light absorbing layer (e.g. layer 512 in FIG. 23) is to be coated on the addressing electrode, such layer is preferably non-conductive, such as polyimide with carbon particles (e.g. DARC (TM) from Brewer Science). Or other dark colored ceramic films such as CrNx, CrOx, TiAlN, TaNx or other films comprising of carbon, such as amorphous CN, amorphous CAlN, TiCN, a-DLC, SiC, TiAlCN, WC, etc. In the alternative, conductive dark films could be used that are placed directly over the addressing electrodes and are electrically connected to the addressing electrodes. Such a film could be a dark metal or metal alloy such as sputtered black chrome or niobium that has a reflectance as low as 3%. The black chrome coating can be a multilayer structure of chrome and chromium oxide (to match the index of refraction, as in an antireflective coating multilayer film). Of course, other opaque films (preferably those with high optical density, thermally stable and with low reflectivity) can be deposited and patterned (the opacity and color of many films being variable due to deposition parameters). Light absorbing conductive materials that can be deposited on the electrodes include black nickel, and films comprising carbon, such as a-DLC or vitreous carbon. It is also possible to deposit a dark electrically conductive grid or matrix surrounding all of the electrodes (without electrically connecting the electrodes).

The light absorbing/blocking layers can be deposited by any suitable film forming methods—such as standard deposition and patterning techniques. For example, the metals and metal alloys can be deposited by sputtering a target in an inert atmosphere. Other techniques, such as electroplating can be used. For ceramic materials, a target can be reactively sputtered—such as in a nitrogen atmosphere to form nitride ceramic films. Or, some films can be deposited by chemical vapor deposition as known in the art. Patterning of the films to form matrices, bands, strips or other designs can be by any suitable etching chemistry—such as by a chlorine (plasma) etch after deposition and patterning of a photoresist. It is also possible to deposit and pattern a photoresist followed by deposition of the light absorbing material.

In addition, the exposed areas of the micromirror device which are not designated for reflecting the incident light are also preferably coated with the light absorbing material as discussed above. For example, the surface exposed to the incident light can be coated with the light absorbing material.

In addition to the light absorbing/blocking layers, an "antireflective coating" (an AR film) can also be deposited on the on the electrode substrate, the internal surface of the frame wall, the addressing electrode, the exposed top surface of the frame wall and any other exposed areas other than the reflective surface of the mirror plate in the micromirror. For example a normally absorptive surface (coated with a light absorbing/blocking material) can have enhanced absorption if an "AR film" stack (for example light transmissive dielectric layers), are placed above it so that light reflection is reduced due to destructive interference. Such dielectrics layers can be designed to work particularly well at certain wavelengths and/or angles—and can be used for the matrix or frame on the light transmissive substrate, as will be discussed below.

The light blocking/absorbing layers as discussed above can also be applied to a micromirror array having an array of micromirrors described above, as shown in FIG. 24.

Figure 24:
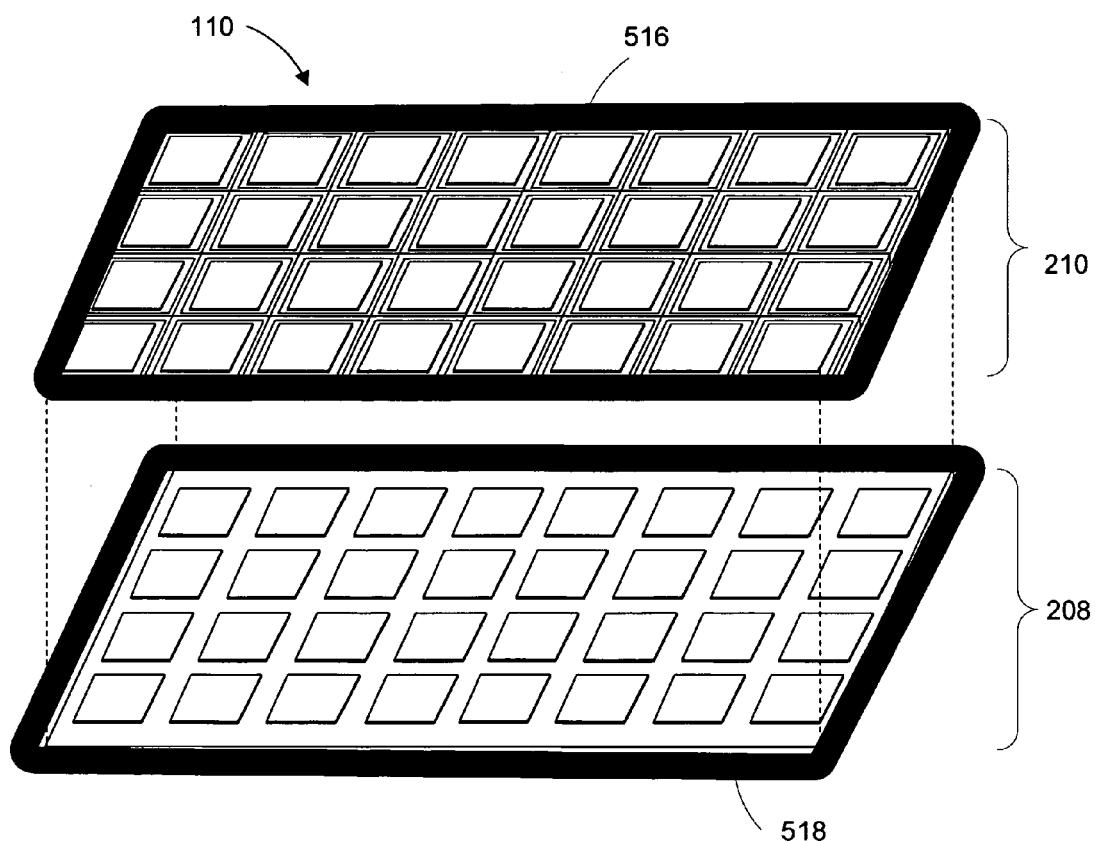
FIG. 24 demonstratively illustrates light blocking/absorbing frames formed on the mirror substrate or the electrode substrate or both.

Referring to FIG. 24, light blocking/absorbing layer 516 is deposited around the perimeter of mirror substrate 210 having an array of micromirrors. Alternatively, light absorbing/blocking layer 518 can be deposited around the perimeter of electrode substrate 208. Of course, the light absorbing/blocking layers can be applied individually or in combination. The light absorbing/blocking layers can alternatively be formed in other suitable forms other than a frame. For example, they can be formed as a grid such that the micromirrors (and/or the addressing electrodes) are located in the nets of the grid and surrounded by the light absorbing/blocking material. The light blocking/absorbing layers can also be formed as strips, segments, and any combination with frames and grids.

It will be appreciated by those skilled in the art that a micromirror device and a method of making the same have been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof. In the claims, only elements denoted by the words "means for" are intended to be interpreted as means plus function claims under 35 U.S.C. §112, the sixth paragraph.

We claim:

1. A spatial light modulator device, comprising:
   an array of micromirror devices on a substrate, each of which comprises:
   a reflective mirror plate;
   a hinge to which the mirror plate is attached such that the mirror plate can move relative to the substrate, wherein the deformable hinge is positioned in a different plane than the mirror plate leaving a gap between the mirror plate and hinge in a direction perpendicular to the mirror plate when the mirror plate is not moved;
   wherein the deformable hinge comprises single crystal silicon.

2. The device of claim 1, wherein the mirror plate is single crystal silicon.

3. The device claim 1, wherein the deformable hinge is single crystal silicon.

4. The device of claim 3, wherein the mirror plate is a thin film.

5. The device of claim 1, wherein both of the mirror plate and the deformable hinge are single crystal silicon.

6. The device of claim 1, further comprising: an array of addressing electrodes, each of which is associated with mirror plate for deflecting said mirror plate.

7. The device of claim 1, wherein the mirror plate comprises a layer comprising aluminum for reflecting light.

8. The device of claim 7, wherein the mirror plate further comprises a barrier layer between a surface of the mirror plate and the aluminum.

9. The device of claim 8, wherein the barrier layer comprises $TiN_x$.

10. The device of claim 8, wherein the barrier layer comprises $SiN_x$.

11. The device of claim 8, wherein the barrier layer comprises $SiO_x$.

12. The device of claim 1, wherein the hinge comprises Si.

13. The device of claim 1, wherein the hinge is formed from a single crystal that is doped with a material that is a rare-earth element or a transition metal element.

14. The device of claim 1, wherein a center-to-center distance between adjacent micromirrors in the micromirror array is 10.16 microns or less.

15. The device of claim 14, wherein the center-to-center distance between adjacent micromirrors in the micromirror array is from 4.38 to 10.16 microns.

16. The device of claim 1, wherein the nearest distance between mirror plates of the adjacent micromirrors in the micromirror array is 0.5 micron or less.

17. The device of claim 1, wherein the nearest distance between mirror plates of the adjacent micromirrors in the micromirror array is from 0.1 to 0.5 micron.

18. The device of claim 1, wherein a vertical distance between the mirror plate and the deformable hinge is 0.45 micron or less.

19. The device of claim 1, wherein the vertical distance between the mirror plate and the deformable hinge is from 0.1 to 0.45 micron or less.

20. The device of claim 1, wherein the mirror plate has a thickness of 0.5 micron or less.

21. The device of claim 1, wherein the mirror plate is attached to the hinge such that the mirror plate is operable to rotate to a maximum angle in one direction larger than a maximum angle in another direction.

22. The device of claim 1, wherein the mirror plate is operable to rotate to an angle of 14° degrees or more.

23. The device of claim 22, wherein the mirror plate is operable to rotate to an angle of 16° degrees or more.

24. The device of claim 22, wherein the mirror plate is operable to rotate to an angle of 12° degrees or more.

25. A projection system, comprising:
   an illumination system providing illumination light for the system; and
   a spatial light modulator of claim 1.

26. The projection system of claim 25, further comprising:
   a condensing lens directing the illumination light onto the spatial light modulator.

27. The projection system of claim 25, further comprising:
   a projection lens directing the illumination light from the spatial light modulator on to a display target.

28. The projection system of claim 25, wherein the illumination system further comprises:
   a light course providing a white light beam; and
   a lightpipe directing the white light beam to a color wheel, wherein the color wheel comprises a set of primary color segments that split the white light beam into a set of primary color light beams.

29. The projection system of claim 25, wherein the illumination system further comprises:
   a light course providing a white light beam;
   a color wheel comprising a set of primary color segments that split the white light beam into a set of primary color light beams; and
   a lightpipe directing the primary color light beams onto the spatial light modulator.

* * * * *